US011904194B2

(12) United States Patent
Wroblewski et al.

(10) Patent No.: US 11,904,194 B2
(45) **Date of Patent: *Feb. 20, 2024**

(54) STREAM STRAIGHTENER

(71) Applicant: Oshkosh Corporation, Oshkosh, WI (US)

(72) Inventors: Anthony J. Wroblewski, Oshkosh, WI (US); Brian D. Piller, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/201,859

(22) Filed: Mar. 15, 2021

(65) Prior Publication Data

US 2021/0196999 A1 Jul. 1, 2021

Related U.S. Application Data

(63) Continuation of application No. 16/241,571, filed on Jan. 7, 2019, now Pat. No. 10,946,226.

(60) Provisional application No. 62/614,747, filed on Jan. 8, 2018.

(51) Int. Cl.

*A62C 31/03* (2006.01)
*B05B 1/34* (2006.01)
*A62C 31/05* (2006.01)

(52) U.S. Cl.

CPC ............ *A62C 31/03* (2013.01); *B05B 1/3402* (2018.08); *A62C 31/05* (2013.01)

(58) Field of Classification Search

CPC ................................ A62C 31/03; A62C 31/05
USPC .............................. 239/590–590.5, 502, 503
See application file for complete search history.

(56) References Cited

U.S. PATENT DOCUMENTS

| | | | | |
|---|---|---|---|---|
| 5,169,065 | A | 12/1992 | Bloch | |
| 5,788,158 | A | 8/1998 | Relyea | |
| 5,839,664 | A | 11/1998 | Relyea | |
| 6,860,332 | B1 | 3/2005 | Archer et al. | |
| 7,445,166 | B2 | 11/2008 | Williams | |
| 10,946,226 | B2 * | 3/2021 | Wroblewski ........... | A62C 31/03 |
| 2006/0037760 | A1 | 2/2006 | Froland et al. | |
| 2006/0065411 | A1 | 3/2006 | Linsmeier et al. | |
| 2007/0034389 | A1 | 2/2007 | Relyea et al. | |
| 2007/0284156 | A1 | 12/2007 | Grady et al. | |
| 2008/0099213 | A1 | 5/2008 | Morrow et al. | |
| 2009/0095545 | A1 | 4/2009 | Crabtree et al. | |
| 2012/0193109 | A1 | 8/2012 | Moore et al. | |
| 2014/0238704 | A1 | 8/2014 | Moore et al. | |
| 2014/0262355 | A1 | 9/2014 | Linsmeier | |
| 2014/0367480 | A1 | 12/2014 | Toh et al. | |
| 2016/0144209 | A1 | 5/2016 | Moore | |

(Continued)

*Primary Examiner* — Christopher S Kim
(74) *Attorney, Agent, or Firm* — Foley & Lardner LLP

(57) ABSTRACT

A nozzle assembly includes a nozzle body, a first flow straightener coupled to the nozzle body, and a second flow straightener coupled to the nozzle body. The nozzle body defines an inlet, an outlet, and a nozzle body passage extending between the inlet and the outlet. The first flow straightener extends at least partially across the nozzle body passage and defines a first passage and a second passage each fluidly coupling the inlet and the outlet. The second flow straightener extends at least partially across the nozzle body passage and defines a third passage and a fourth passage each fluidly coupling the inlet and the outlet.

15 Claims, 22 Drawing Sheets

(56) References Cited

U.S. PATENT DOCUMENTS

| | | | |
|---|---|---|---|
| 2016/0144210 | A1 | 5/2016 | Betz et al. |
| 2017/0050063 | A1 | 2/2017 | Shively et al. |
| 2017/0056695 | A1 | 3/2017 | Moore |
| 2017/0182340 | A1 | 6/2017 | Moore |
| 2018/0064973 | A1 | 3/2018 | Moore |
| 2018/0221694 | A1 | 8/2018 | Shively et al. |
| 2018/0297597 | A1 | 10/2018 | Linsmeier et al. |
| 2019/0015692 | A1 | 1/2019 | Fieber et al. |
| 2019/0209881 | A1 | 7/2019 | Wroblewski et al. |

* cited by examiner

STREAM STRAIGHTENER

CROSS-REFERENCE TO RELATED PATENT APPLICATION

This application is a continuation of U.S. patent application Ser. No. 16/241,571, filed Jan. 7, 2019, which claims the benefit of U.S. Provisional Patent Application No. 62/614,747, filed Jan. 8, 2018, both of which are incorporated herein by reference in their entireties.

BACKGROUND

Fire suppressant fluid (e.g., water, fire-suppressant foam, etc.) is commonly used to contain various types of fires (e.g., industrial fires, residential fires, etc.). To distance the operators from the fire and the associated dangers (e.g., burns, explosions from the fire contacting a container of a volatile substance, etc.), a nozzle assembly provides a jet of fluid that extends over a distance. Nozzles receive pressurized fluid from a high-pressure source (e.g., a pump, a fire hydrant, etc.), and direct the fluid to form the jet. When spraying over long distances, however, the jet can experience fluid fallout, where fluid falls out of the desired jet trajectory and fails to contact the target area. Due to fluid fallout, a significant amount of the fluid that is expelled from the nozzle is wasted, and the effectiveness of the jet in suppressing the fire is reduced. Accordingly, there is a need to reduce fluid fallout when spraying a jet of fluid over long distances.

SUMMARY

One exemplary embodiment relates to a nozzle assembly including a nozzle body, a first flow straightener coupled to the nozzle body, and a second flow straightener coupled to the nozzle body. The nozzle body defines an inlet, an outlet, and a nozzle body passage extending between the inlet and the outlet. The first flow straightener extends at least partially across the nozzle body passage and defines a first passage and a second passage each fluidly coupling the inlet and the outlet. The second flow straightener extends at least partially across the nozzle body passage and defines a third passage and a fourth passage each fluidly coupling the inlet and the outlet.

Another exemplary embodiment relates to a nozzle assembly including a nozzle body and a stream straightener. The nozzle body defines an inlet, an outlet, and a nozzle body passage extending between the inlet and the outlet. The stream straightener is coupled to the nozzle body and extends at least partially across the nozzle body passage. The stream straightener defines a first passage and a second passage each extending through the stream straightener to fluidly couple the inlet and the outlet of the nozzle body. The first passage defines a first passage inlet and a first passage outlet. The second passage defines a second passage inlet and a second passage outlet. The first passage is tapered such that a cross-sectional area of the first passage decreases as the first passage extends from the first passage inlet to the first passage outlet. A cross-sectional area of the second passage is substantially constant from the second passage inlet to the second passage outlet.

Another exemplary embodiment relates to a nozzle assembly including a nozzle body, a first flow straightener coupled to the nozzle body and a second flow straightener coupled to the nozzle body. The nozzle body defines an inlet, an outlet, and a nozzle body passage extending between the inlet and the outlet. The first flow straightener extends at least partially across the nozzle body passage. The first flow straightener defines a first passage and a second passage each fluidly coupling the inlet and the outlet. The first passage defines a first passage inlet and a first passage outlet. The second passage defines a second passage inlet and a second passage outlet. The second flow straightener extends at least partially across the nozzle body passage. The second flow straightener defines a third passage and a fourth passage each fluidly coupling the inlet and the outlet. At least one of (a) a cross-sectional area of the second passage inlet is less than a cross-sectional area of the first passage inlet and (b) a cross-sectional area of the second passage outlet is less than a cross-sectional area of the first passage outlet. The first passage is tapered such that a cross-sectional area of the first passage decreases as the first passage extends towards the outlet. The second flow straightener is positioned between the first flow straightener and the outlet of the nozzle body. The first passage of the first flow straightener is aligned with the third passage of the second flow straightener. The second passage of the first flow straightener is aligned with a face of the second flow straightener. A cross-sectional area of the second passage is substantially constant from the second passage inlet to the second passage outlet.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a nozzle assembly is configured to receive high-pressure fluid from a high-pressure fluid source and provide a jet of fluid that extends over a distance to a target area. The nozzle assembly includes a nozzle body, a nozzle, and a stream straightener. The nozzle body is configured to receive the high-pressure fluid at an inlet and provide the fluid through a passage to the nozzle, which produces the jet. The nozzle body has a straight portion and a reducer. The passage tapers downward or otherwise reduces in cross-sectional area in the reducer. The velocity of the fluid increases as it passes through the reducer. The stream straightener is positioned within the straight portion of the nozzle body. The stream straightener is positioned such that the fluid passes through the stream straightener prior to entering the reducer of the nozzle body. The stream straightener includes a series of parallel circular tubes that are coupled (e.g., fixedly, etc.) to a pair of longitudinally-spaced plates. By way of example, the parallel circular tubes may be welded to the longitudinally-spaced plates. The circular tubes may be parallel or may be angularly offset relative to one another, according to various embodiments. By way of example, the circular tubes may be arranged to create a vortex or spin the fluid as it passes through the stream straightener. Fluid passing through the stream straightener passes through the tubes, reducing lateral movement of the fluid such that the fluid exits the stream straightener in a uniform longitudinal flow. The addition of the stream straightener increases the range of the jet and reduces fluid fallout from the jet, ensuring that more fluid contacts the target area.

Figure 1:
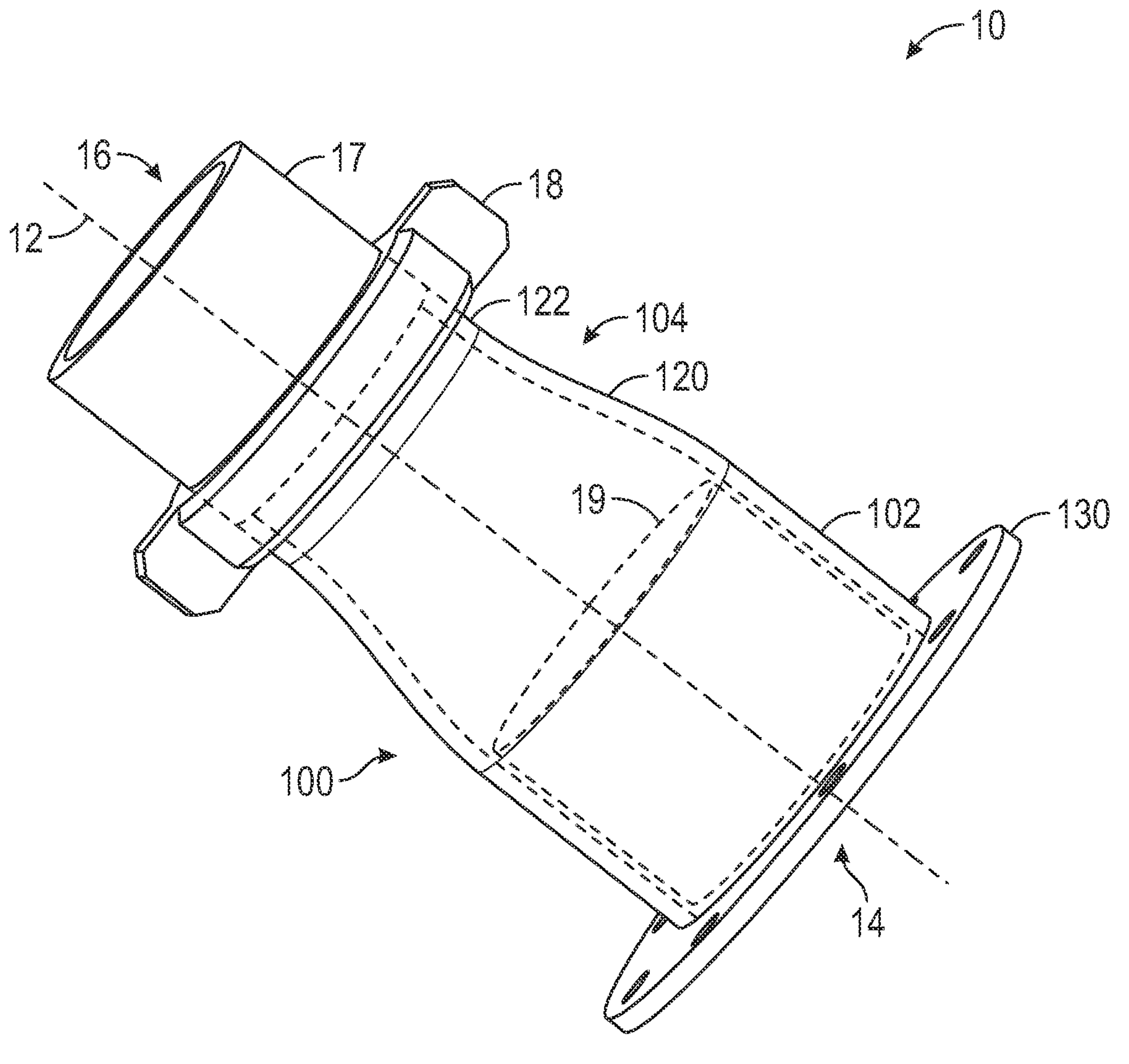
FIG. 1 is a perspective view of a nozzle assembly, according to an exemplary embodiment.

Referring to FIG. 1, a nozzle, shown as nozzle assembly 10, extends along a longitudinal axis 12. The nozzle assembly 10 is configured to receive a pressurized fluid (e.g., water, fire-suppressant foam, etc.) at an inlet 14 and deliver a jet of fluid out of an outlet 16. The jet of fluid extends over a distance to reach a target area. By way of example, the nozzle assembly 10 may be used with a high-pressure fluid source to extinguish a fire on a target object (e.g., a building, a vehicle, a tree, a field of grass, etc.). The inlet 14 is defined by a main body or nozzle body assembly, shown as nozzle body 100. The outlet 16 is defined by a nozzle tip or nozzle tip assembly, shown as nozzle 17. The nozzle 17 is removably coupled to the nozzle body 100 by a coupler 18 such that the nozzle 17 can be interchanged with other nozzles that have different flow characteristics, depending upon the situation. The nozzle body 100 defines a passage that contains a stream or flow straightener assembly, shown as stream straightener 19. The stream straightener 19 defines a series of passages, through which fluid flows. The stream straightener 19 straightens the flow of fluid through the nozzle assembly 10, which reduces the size of the jet leaving the nozzle assembly 10 and fluid fallout from the jet and extends the range of the jet. The extended range of the jet provided by the nozzle assembly 10 facilitates providing a large volume of fluid to the target object while keeping personnel and equipment a significant distance away from the fire.

The nozzle assembly 10 is configured for use with a variety of different high-pressure fluid sources. In the embodiment shown in FIG. 2, the nozzle assembly 10 is configured for use with a fire apparatus 20. The fire apparatus 20 may be a municipal fire apparatus, an aircraft rescue and firefighting vehicle, a non-firefighting vehicle, etc. Specifically, the nozzle assembly 10 is coupled to a monitor 22 of the fire apparatus 20. The monitor 22 is pivotally coupled to a chassis 24 of the fire apparatus 20 to facilitate aiming a jet J of fluid toward a target object. Alternatively, the monitor 22 may be coupled to an aerial ladder assembly of a fire apparatus. The monitor 22 may be motorized or operated by hand. As illustrated, the fire apparatus 20 includes a high-pressure supply of fluid, shown as pump 26, powered by a prime mover (e.g., an engine, an electric motor, etc.) that pressurizes fluid from a low-pressure supply (e.g., a lake, a reservoir, an onboard tank, etc.) to provide a high-pressure supply of fluid to the nozzle assembly 10 through the monitor 22. Alternatively, the fire apparatus 20 may receive a high-pressure supply of fluid from another source (e.g., a second fire apparatus, a fire hydrant, etc.) and fluidly couple the high-pressure supply to the nozzle assembly 10 through the monitor 22. In other embodiments, the nozzle assembly 10 may be coupled to a hose (e.g., a fire hose, a garden hose, etc.) held by an operator. In yet other embodiments, the nozzle assembly 10 may be coupled to a monitor that is directly coupled to a fire hydrant or other stationary high-pressure fluid source.

Figure 3:
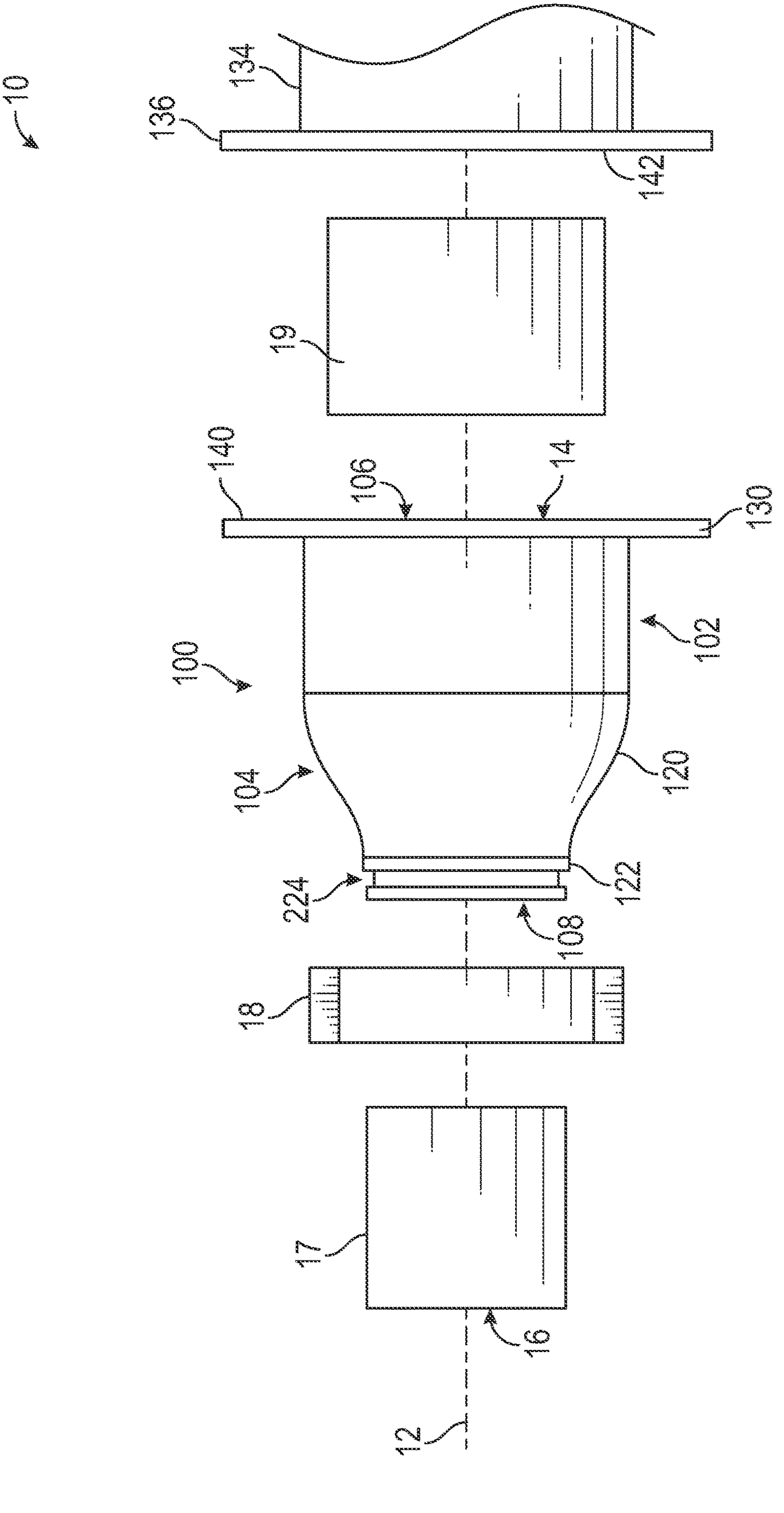
FIG. 3 is an exploded view of the nozzle assembly of FIG. 1.

Referring to FIGS. 1 and 3, the nozzle assembly 10 includes a main body or nozzle body assembly, shown as nozzle body 100. The nozzle body 100 includes a first portion (e.g., a stream straightener receiving portion), pipe, or conduit, shown as straight portion 102, directly and fixedly coupled to a second portion, reducer, or conduit, shown as a reducer 104. The straight portion 102 and the reducer 104 cooperate to define a main body passage or nozzle body passage, shown as passage 106, extending along the longitudinal axis 12 between the inlet 14 and an outlet 108. Although the nozzle body 100 is shown with the straight portion 102 and the reducer 104 positioned immediately adjacent one another, additional tubular members of various cross-sectional shapes and sizes may be added to the nozzle body 100 in other embodiments.

Figure 5:
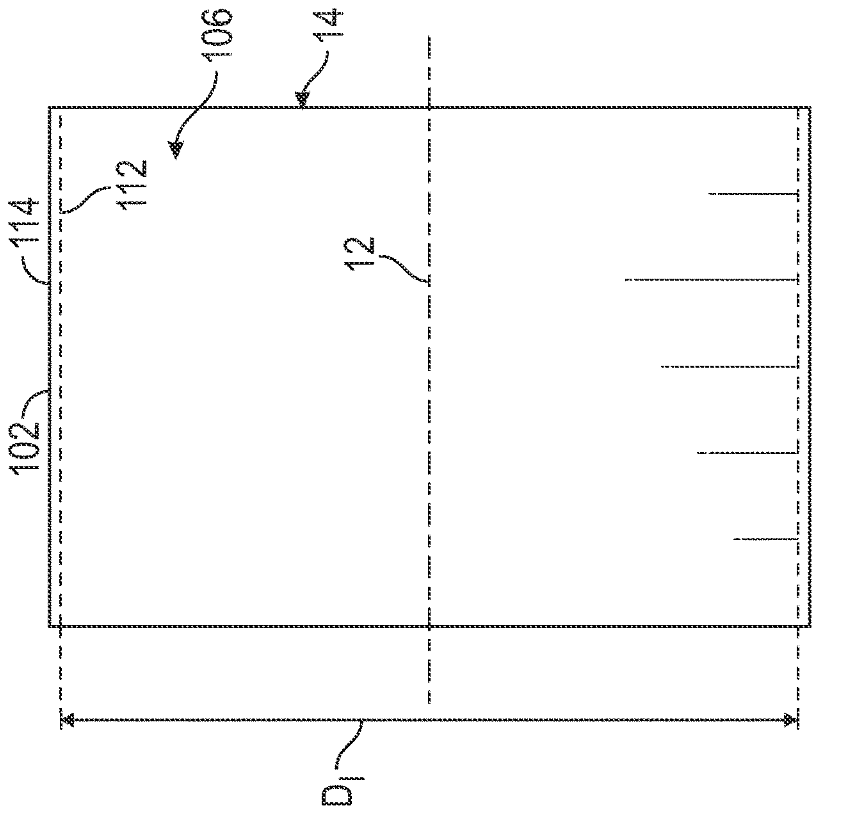
FIG. 5 is a side view of the straight portion of FIG. 4.
Figure 4:
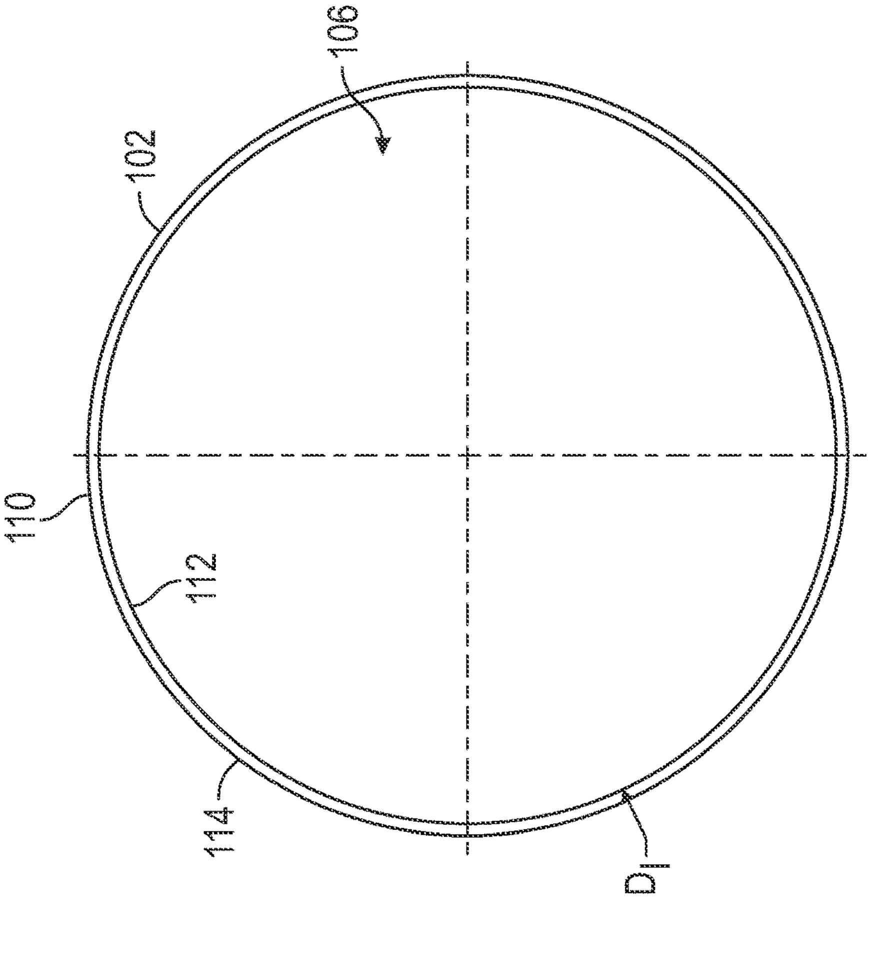
FIG. 4 is a front view of a straight portion of a nozzle body of the nozzle assembly of FIG. 1.
Figure 7:
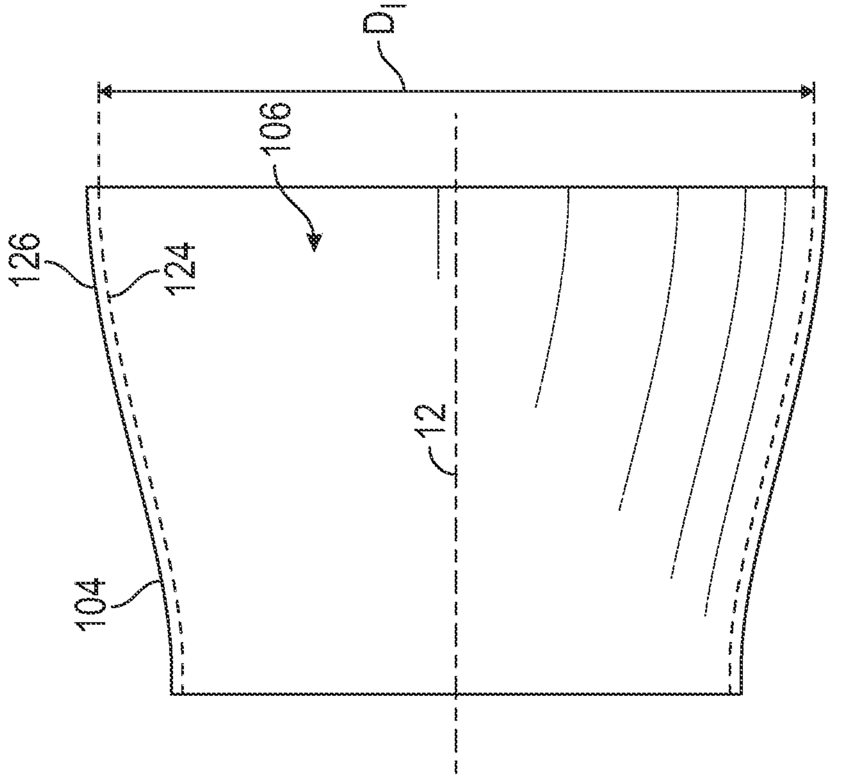
FIG. 7 is a side view of the reducer of FIG. 6.
Figure 6:
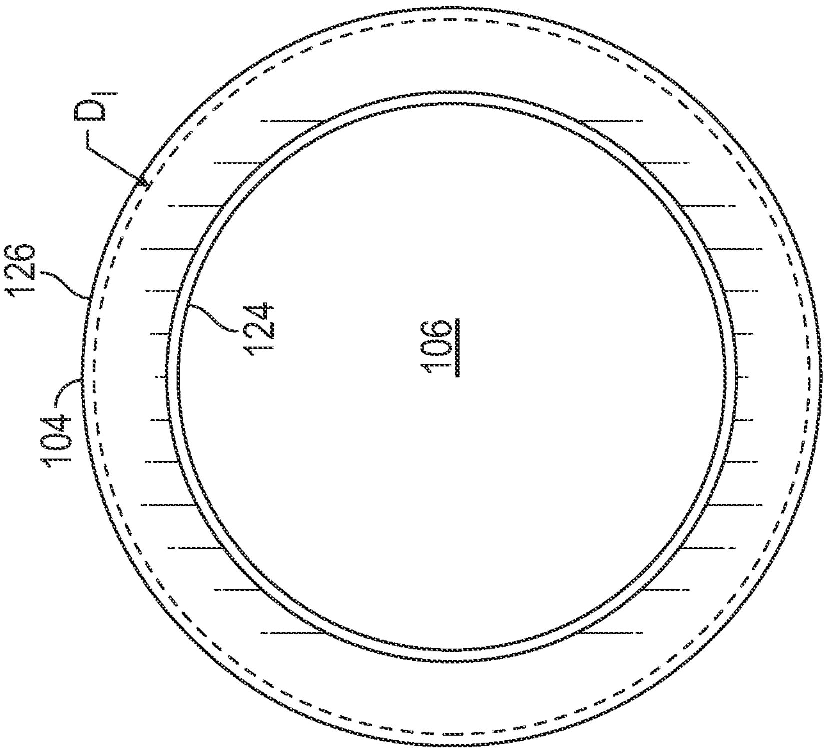
FIG. 6 is a front view of a reducer of the nozzle body of the nozzle assembly of FIG. 1.
Figure 8:
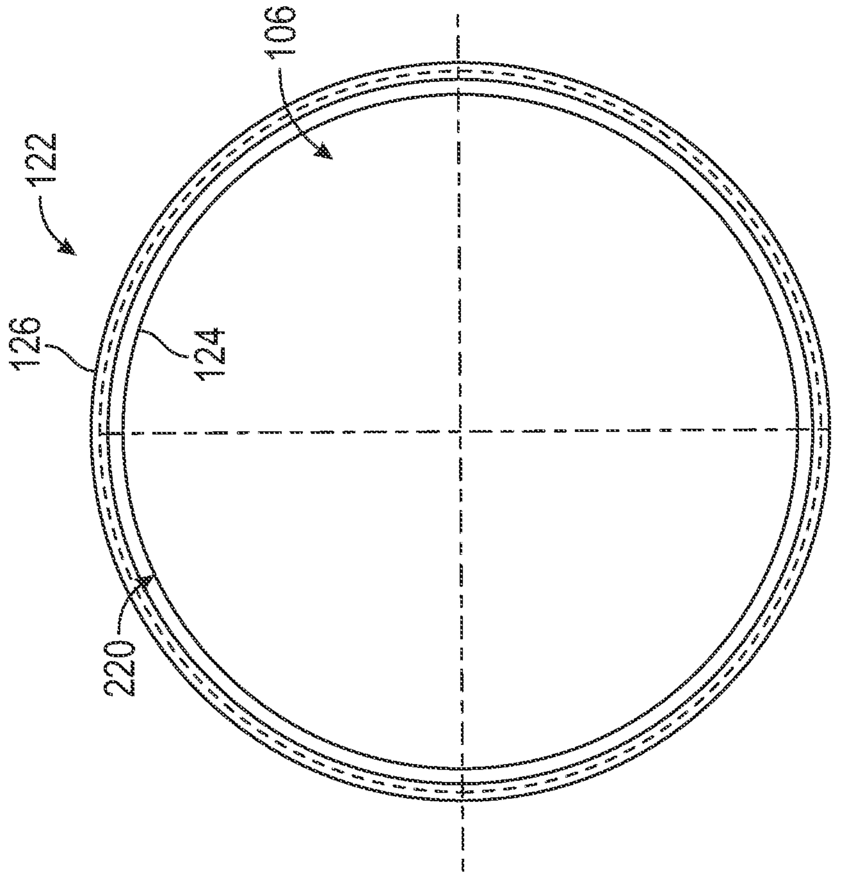
FIG. 8 is a front view of a nozzle coupling portion of the nozzle body of the nozzle assembly of FIG. 1.
Figure 9:
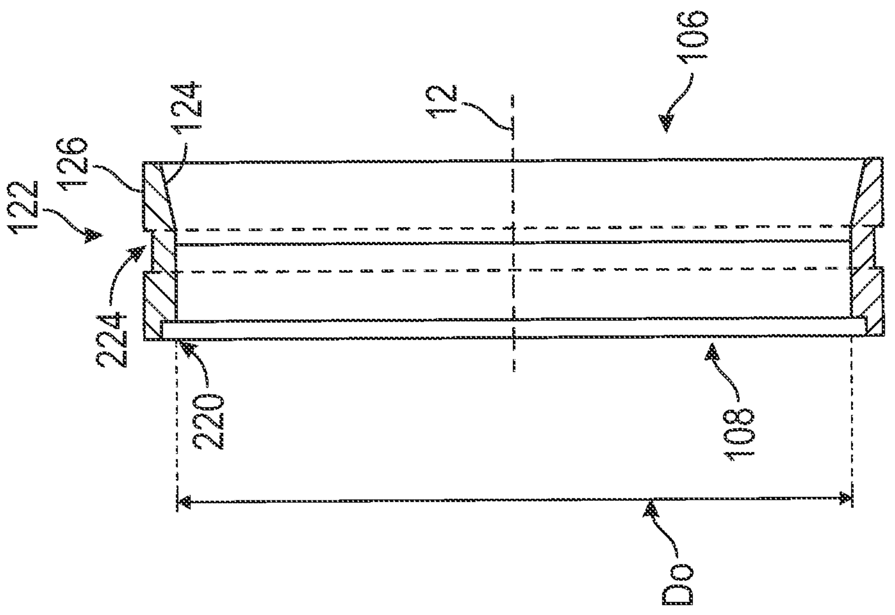
FIG. 9 is a side section view of the nozzle coupling portion of FIG. 8.
Figure 11:
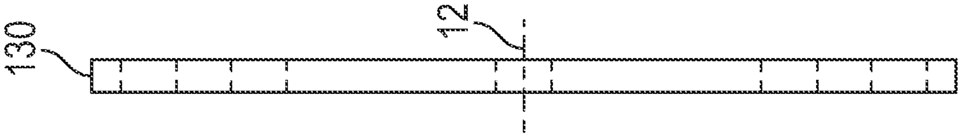
FIG. 11 is a side view of the mounting flange of FIG. 10.

Referring to FIGS. 4 and 5, the straight portion 102 is a cylindrical tube having an annular wall 110. The annular wall 110 has an inner surface 112 and an outer surface 114 that each extend along the longitudinal axis 12. The inner surface 112 is cylindrical and defines a portion of the passage 106. The inner surface 112 has a constant diameter $D_I$. Accordingly, the portion of the passage 106 within the straight portion 102 is also cylindrical. As such, a cross section of this portion of the passage 106 taken perpendicular to the longitudinal axis 12 forms a circle. The area of this cross section is substantially constant throughout the straight portion 102. Although the outer surface 114 is shown to be circular as well, in other embodiments the shape of the outer surface 114 varies.

Referring to FIGS. 3 and 6-9, the reducer 104 has an annular wall 120 directly and fixedly coupled to a nozzle coupling portion 122. The annular wall 120 and the nozzle coupling portion 122 cooperate to define an inner surface 124 and an outer surface 126 that each extend along the longitudinal axis 12. Adjacent the straight portion 102, the inner surface 124 has a diameter $D_I$ that is equal to the diameter $D_I$ of the straight portion 102. As the reducer 104 extends away from the straight portion 102 and toward the outlet 108, the portion of the passage 106 positioned within the reducer 104 gradually reduces in size. Adjacent the outlet 108, the inner surface 124 has a diameter $D_O$, which is smaller than the diameter $D_I$. The inner surface 124 defines a portion of the passage 106 adjacent to the portion of the passage 106 defined by the straight portion 102. A cross section of the portion of the passage 106 within the reducer 104 taken perpendicular to the longitudinal axis 12 forms a circle. As the passage 106 extends away from the straight portion 102 and toward the outlet 108, the area of this cross section gradually decreases. Although the outer surface 126 is shown as being shaped similarly to the inner surface 124, in other embodiments the shape of the outer surface 126 varies.

Referring to FIGS. 1, 3, 10, and 11, the nozzle body 100 further includes a coupler, shown as mounting flange 130, extending radially outward from the straight portion 102. The mounting flange 130 defines a central aperture 132 configured to receive the straight portion 102. The mounting flange 130 is fixedly coupled to the straight portion 102. A seal is formed between the mounting flange 130 and the straight portion 102. By way of example, the central aperture 132 may be sized slightly larger than the outer surface 114, and a weld may extend along the circumference of the central aperture 132 between the outer surface 114 and the mounting flange 130. Alternatively, the mounting flange 130 may abut an end of the straight portion 102, and the central aperture 132 may have a diameter substantially equal to diameter $D_I$.

Figure 10:
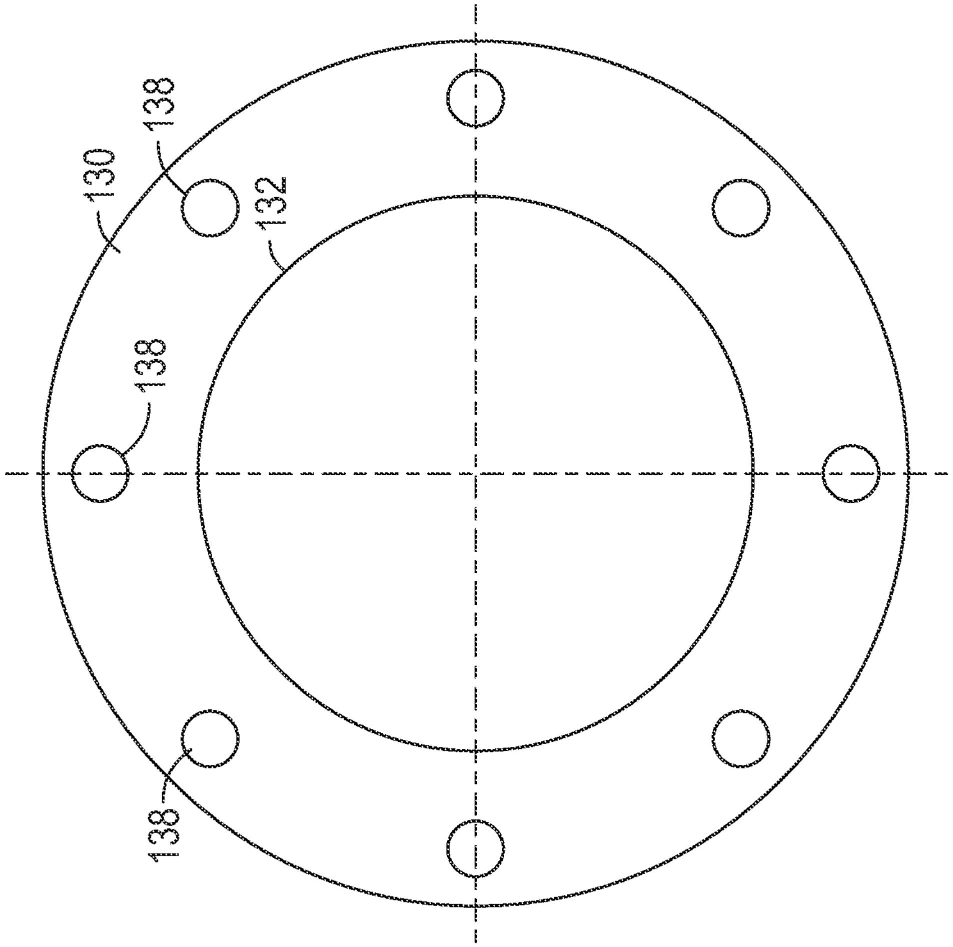
FIG. 10 is a front view of a mounting flange of the nozzle body of the nozzle assembly of FIG. 1.

Referring to FIGS. 3 and 10, the mounting flange 130 is configured to selectively fixedly couple the nozzle body 100 to a high-pressure fluid source 134 (e.g., the monitor 22, a hose, etc.). Once connected, the mounting flange 130 seals against the high-pressure fluid source 134, fluidly coupling the inlet 14 to a high-pressure fluid supply. As illustrated, the high-pressure fluid source 134 includes a mounting flange 136 configured to interface with the mounting flange 130. The mounting flange 130 defines a series of fastener apertures 138 arranged in a circular pattern centered about the longitudinal axis 12. Although eight fastener apertures 138 are shown, the mounting flange 130 may define more or fewer fastener apertures 138. Once assembled, a planar surface 140 of the mounting flange 130 abuts a corresponding planar surface 142 of the mounting flange 136. A series of fasteners extend through the fastener apertures 138 and a corresponding set of apertures on the mounting flange 136, selectively coupling the mounting flange 130 to the mounting flange 136 and sealing the planar surface 140 against the planar surface 142. Alternatively, a gasket or other sealing member may be placed between the mounting flange 130 and the mounting flange 136 to facilitate a sealed connection.

Alternatively, other types of couplers may be used to couple the nozzle body 100 to the high-pressure fluid source 134. By way of example, the nozzle body 100 may have a female thread, and the high-pressure fluid source may have a corresponding male thread. By way of another example, the nozzle body 100 may be coupled to the high-pressure fluid source 134 using a ring coupler.

Figure 12:
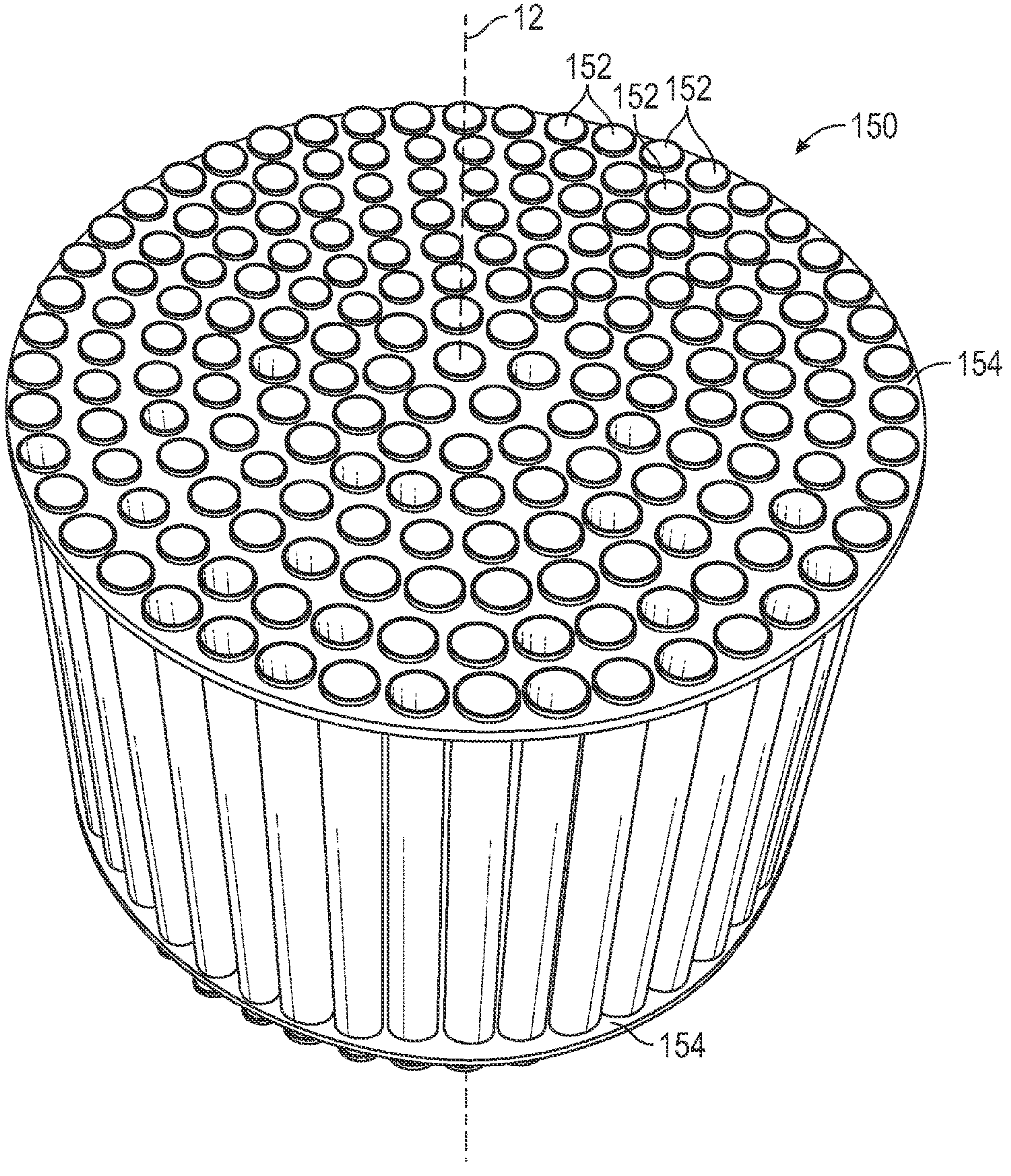
FIG. 12 is a perspective view of a stream straightener of the nozzle assembly of FIG. 1.

As shown in FIG. 12, in one embodiment, the stream straightener 19 of the nozzle assembly 10 is a stream or flow straightener assembly, shown as stream straightener 150. The stream straightener is configured to be inserted into the nozzle body 100 between the inlet 14 and the outlet 108. In some embodiments, the stream straightener 150 is positioned entirely within the straight portion 102. In other embodiments, the stream straightener 150 extends within both the straight portion 102 and the reducer 104. The stream straightener 150 is configured to receive a disordered and/or turbulent flow of fluid and output a uniform, straightened flow of fluid. When placed within the passage 106 of the nozzle body 100, the stream straightener 150 straightens fluid flowing from the inlet 14 to the outlet 16, resulting in a jet of fluid that travels a greater distance with reduced fluid fallout.

Figure 14:
FIG. 14 is a side view of the plate of FIG. 13.
Figure 13:
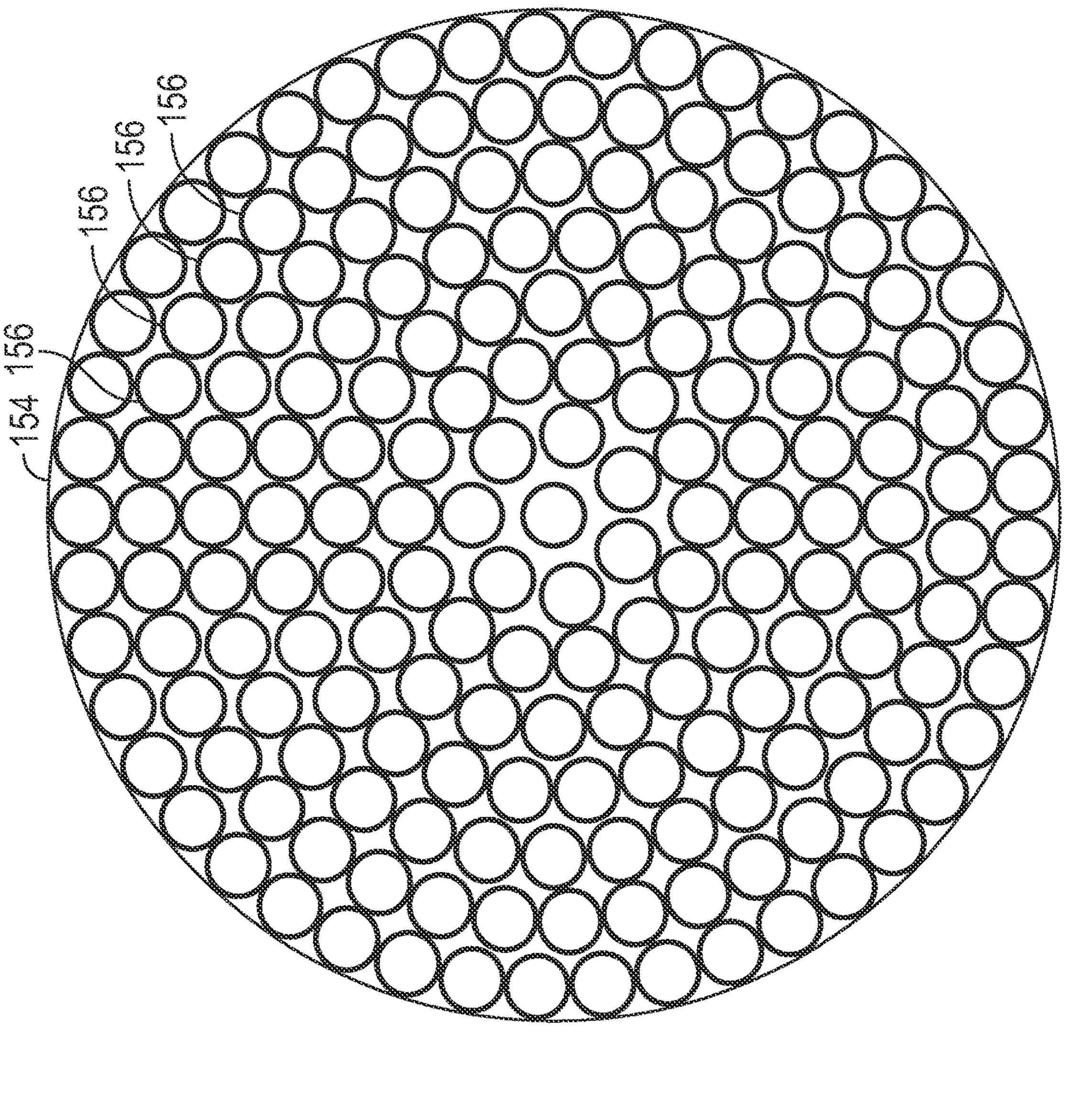
FIG. 13 is a front view of a plate of the stream straightener of FIG. 12.

Referring to FIG. 12, the stream straightener 150 is shown removed from the nozzle body 100. The stream straightener 150 includes a series of conduits, tubular members, or pipes, shown as tubes 152. The tubes 152 each extend through and are fixedly coupled to a pair of inserts, shown as plates 154. As shown in FIGS. 13 and 14, each plate 154 is a circular disc. The plate 154 defines an array of tube receiving apertures, shown as apertures 156, each configured to receive one of the tubes 152. The apertures 156 are arranged in concentric rings or circles, with one aperture 156 positioned on the center of the plate 154, seven apertures 156 positioned in a ring immediately surrounding that, fourteen apertures 156 in a ring immediately surrounding that, etc. In total, each plate 154 defines 184 apertures 156. Both plates 154 are substantially identical (e.g., are a similar size, have apertures 156 in the same locations, etc.). As shown in FIG. 12, the plates 154 are longitudinally offset from one another. Accordingly, with the tubes 152 extending through the apertures 156, all of the tubes 152 extend substantially parallel to one another and substantially parallel to the longitudinal axis 12.

Figure 15:
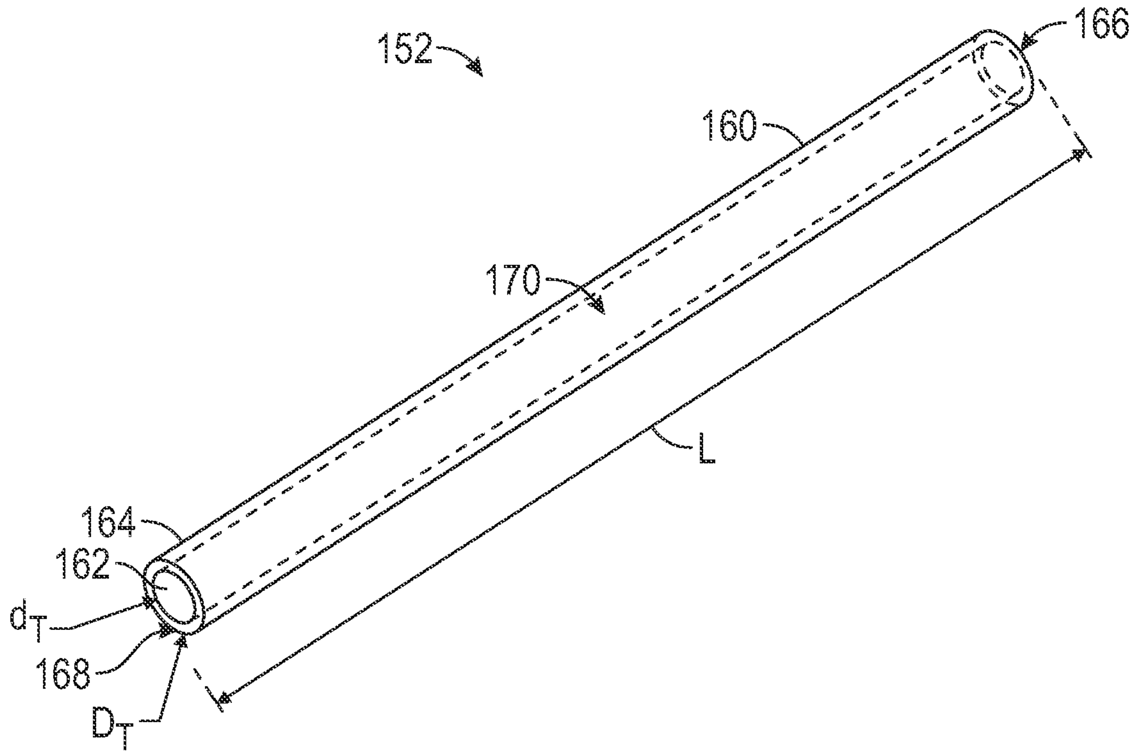
FIG. 15 is a perspective view of a tube of the stream straightener of FIG. 12, according to an exemplary embodiment.

Referring to FIG. 15, each tube 152 is a circular cylindrical member having an annular wall 160. The annular wall 160 has an interior or inner surface 162 and an exterior or outer surface 164, both of which extend along the longitudinal axis 12. Each tube 152 has an overall length L. The inner surface 162 is cylindrical and defines an inlet 166, an outlet 168, and a passage 170 extending therebetween. The inner surface 162 has a constant inner diameter $d_T$. Accordingly, the passage 170 is also cylindrical. As such, a cross section of the passage 170 taken perpendicular to the longitudinal axis 12 forms a circle. The area of this cross section is substantially constant throughout the tube 152. In other embodiments, however, the shape of the outer surface 164 varies.

To assemble the stream straightener 150, the tubes 152 are inserted into the apertures 156 and fixedly coupled (e.g., welded, adhered, etc.) to the plates 154. In some embodiments, any space within the apertures 156 between the tubes 152 and the plates 154 is filled (e.g., with weld), sealing the outer surface 164 of each tube 152 against the plates 154. Due to this seal, all fluid flowing through the nozzle body 100 passes through one or both of (a) the passages 170 of the tubes 152 and (b) the area between the stream straightener 150 and the inner surfaces 112 and 124 of the nozzle body 100. In some embodiments, the stream straightener 150 is configured to seal against one or both of the inner surface 112 and the inner surface 124 such that all fluid flowing through the nozzle body 100 passes through the passages 170 of one or more of the tubes 152. The plates 154 may sealingly engage the nozzle body 100 directly, or an additional sealing member (e.g., an O ring, a gasket, a piece of tubing, etc.) may extend between the stream straightener 150 and the nozzle body 100 to facilitate such a seal. The stream straightener 150 may be removable from the nozzle body 100 (e.g., by pulling the stream straightener 150 out of the inlet 14, without the use of tools, etc.), or the stream straightener 150 may be permanently attached to the nozzle body 100 (e.g., welded to the nozzle body 100).

To vary the degree to which the stream straightener 150 straightens a flow of fluid passing through the nozzle assembly 10, the ratio between the length L and the diameter $d_T$ of each tube 152 may be varied. Increasing the $L/d_T$ ratio may further straighten the flow, and decreasing the $L/d_T$ ratio may reduce the drop in fluid pressure across the stream straightener 150. As shown in FIG. 12, each tube 152 has a length L of approximately 6 inches, an outer diameter $D_T$ of approximately 0.5 inches, and the annular wall 160 is relatively thin, such that the $L/d_T$ ratio is approximately 12. In other embodiments, the dimensions of the tubes 152 are varied, varying the value of the $L/d_T$ ratio to a different value (e.g., 1, 2, 5, 10, 11, 13, 14, 15, 20, 30, etc.). Similarly, the number of tubes 152 is varied between different embodiments. The stream straightener 150 may have more or fewer tubes 152 than shown in FIG. 12 (e.g., 2 tubes, 50 tubes, 100 tubes, 300 tubes, 500 tubes, 1000 tubes, etc.). Increasing the number of tubes 152 reduces the maximum allowable outer diameter $D_T$ for a nozzle body 100 of a given size. This in turn varies the $L/d_T$ ratio for a given length L of the tubes 152 and diameter $D_I$ or $D_O$ of the nozzle body 100. Although the tubes 152 are each shown to have a consistent size, shape, and spacing, in other embodiments, these dimensions vary. By way of example, the tubes 152 may be arranged such that the tubes 152 near the center of the nozzle assembly 10 have a certain $L/_T$ ratio, and the tubes 152 near the outside of the nozzle assembly 10 have a different $L/d_T$ ratio. By way of another example, the tubes 152 may be arranged in rows instead of in a concentric ring pattern. In an alternative embodiment, the stream straightener 150 may be made from a single solid piece of material. In such an embodiment, the passages 170 may be defined by apertures extending through the solid piece.

Figure 17:
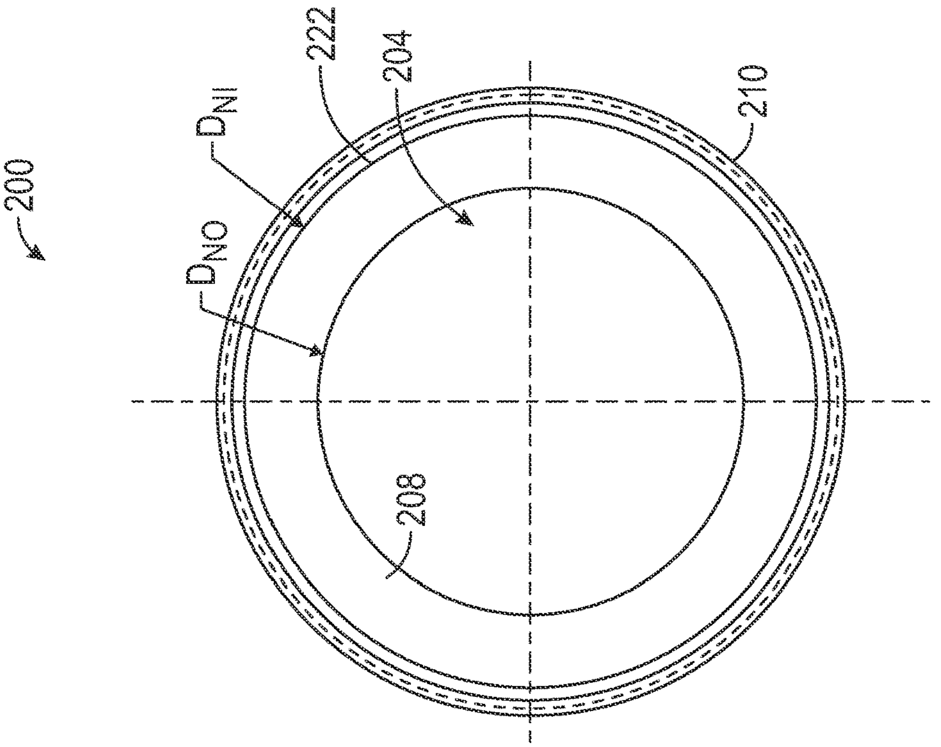
FIG. 17 is a rear view of the nozzle of FIG. 16.
Figure 16:
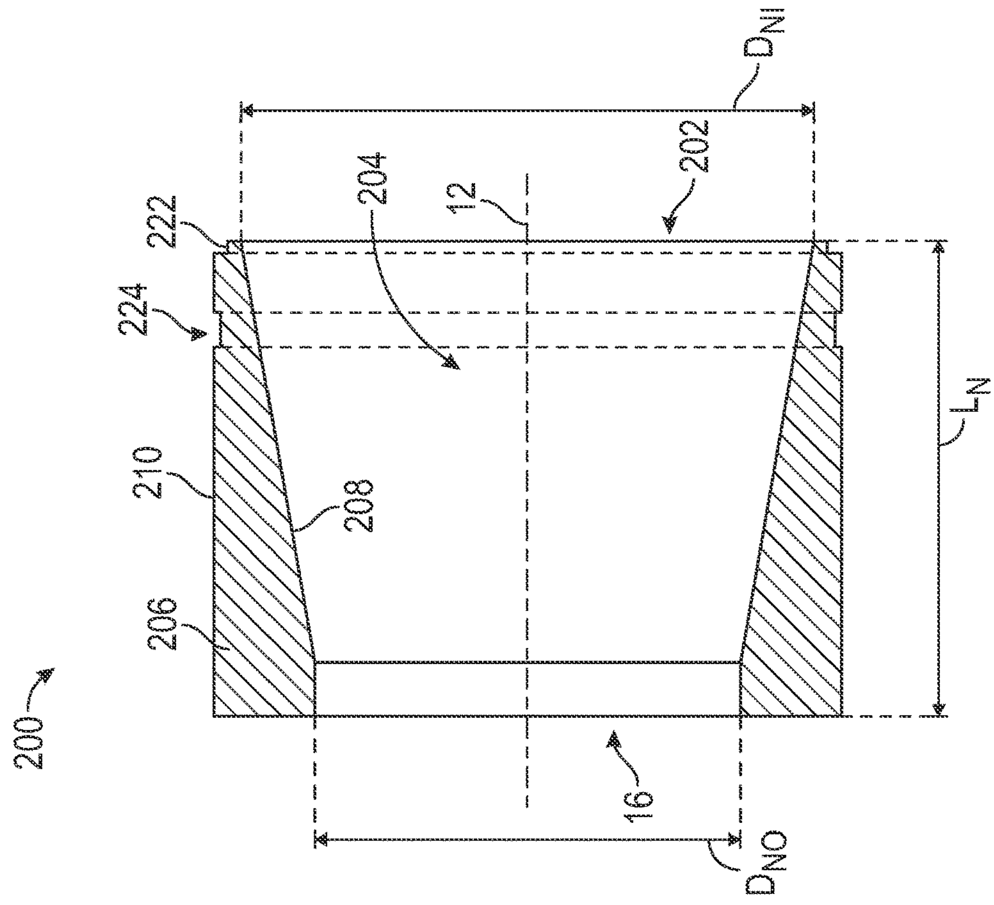
FIG. 16 is a side section view of a nozzle of the nozzle assembly of FIG. 1.

Referring to FIGS. 16 and 17, in some embodiments, the nozzle 17 is a nozzle tip, shown as nozzle 200. The nozzle 200 is configured to further shape the flow of fluid immediately before the fluid leaves the nozzle assembly 10, forming a jet of a desired size and shape. The nozzle 200 defines an inlet 202, the outlet 16, and a nozzle passage 204 extending therebetween. The nozzle 200 is at least selectively coupled to the nozzle body 100 such that the inlet 202 is in fluid communication with the outlet 108 of the nozzle body 100 and the nozzle passage 204 and the passage 106 cooperate to form a continuous passage.

The nozzle 200 includes an annular wall 206 having an inner surface 208 that defines the nozzle passage 204 and an opposing outer surface 210. The nozzle passage 204 has a diameter $D_{NI}$ at the inlet 202. The diameter $D_{NI}$ may be substantially equal to the diameter $D_O$ of the nozzle body 100. As the nozzle passage 204 extends away from the nozzle body 100 (i.e., away from the inlet 202), the nozzle passage 204 gradually reduces in cross-sectional area. In some embodiments, this reduction in cross-sectional area has a constant rate such that at least a portion of the inner surface 208 is frustoconical. Adjacent the outlet 16, a portion of the nozzle passage 204 has a constant diameter $D_{NO}$. Accordingly, the diameter $D_{NO}$ is smaller than the diameter $D_{NI}$. The nozzle 200 has an overall length $L_N$ measured between the inlet 202 and the outlet 16.

FIGS. 18-21 illustrate alternative embodiments of the nozzle 200. The nozzles 200 shown in FIGS. 18-21 are similar to the nozzle 200 shown in FIGS. 16 and 18, however, the overall length $L_N$ and the diameter $D_{NO}$ at the outlet 16 vary between each embodiment. Varying these dimensions changes the size, shape, and range of the jet produced by the nozzle assembly 10 and the resistance of the nozzle assembly 10 to fluid flow. By way of example, reducing the diameter $D_{NO}$ and increasing the length $L_N$ may increase the range of the jet, reduce the size of the jet, and increase the resistance of the nozzle assembly 10 to fluid flow. The diameter $D_{NI}$ at the inlet 202 is constant throughout each of the embodiments to facilitate interfacing with the nozzle body 100. In each of the embodiments, the diameter $D_{NI}$ is 6.065 inches. In the embodiment shown in FIGS. 16 and 17, the diameter $D_{NO}$ is 4.5 inches and the length $L_N$ is 5 inches. In the embodiment shown in FIGS. 18 and 19, the diameter $D_{NO}$ is 3.5 inches and the length $L_N$ is 7.75 inches. In the embodiment shown in FIGS. 20 and 21, the diameter $D_{NO}$ is 5.5 inches and the length $L_N$ is 2 inches. In other embodiments, the nozzle 200 has a different shape and/or different dimensions.

The nozzle 200 is removably coupled to the nozzle body 100 to facilitate interchanging different nozzles 200 for different applications. Referring to FIGS. 8, 9, and 16-21, the nozzle coupling portion 122 of the reducer 104 defines a notch or cutout 220 configured to receive an annular protrusion 222 from the nozzle 200. When the cutout 220 receives the annular protrusion 222, the nozzle 200 abuts the nozzle body 100, and the nozzle 200 aligns with the nozzle body 100 along the longitudinal axis 12 (e.g., the nozzle 200 is concentrically aligned with the nozzle body 100). This ensures that the inner surface 124 of the reducer 104 aligns with the inner surface 208 of the nozzle 200, providing a smooth surface where the passage 106 fluidly couples to the nozzle passage 204.

In some embodiments, the coupler 18 is a ring coupler, and the nozzle coupling portion 122 and the nozzle 200 are configured for use with the ring coupler. Specifically, the nozzle coupling portion 122 and the nozzle 200 each define an annular groove 224 on the outer surface 126 and the outer surface 210, respectively. The annular grooves 224 extend parallel to one another and are spaced apart longitudinally. The annular grooves are configured to receive the coupler 18. The coupler 18 may be one of the rigid couplers offered by the Victaulic Company. The coupler 18 is configured to receive the abutting end portions of the nozzle 200 and the nozzle body 100. When the coupler 18 is tightened (e.g., by tightening a pair of fasteners, etc.), annular protrusions of the ring coupler enter the annular grooves 224, fixedly coupling the nozzle 200 to the nozzle body 100. The coupler 18 may include a gasket, O-ring, or other type of sealing member that presses against the outer surface 126 and the outer surface 210, further sealing the connection between the nozzle 200 and the nozzle body 100. When desired, the coupler 18 may be loosened to allow the nozzle 200 and the nozzle body 100 to be pulled apart. An operator may then interchange the nozzle 200 with a different nozzle suitable for a different application. In other embodiments, the coupler 18 is another type of removable coupler. In yet other embodiments, the nozzle 17 is fixedly coupled to the nozzle body 100. It should be understood that the nozzle assembly 10 is not limited to use with the specific nozzles 17 described herein. Rather, the nozzle assembly 10 may additionally use a variety of other nozzle shapes, sizes, and configurations.

Referring to FIGS. 1-21, various components (e.g., the nozzle body 100, the stream straightener 150, the nozzle 200, etc.) are shown having circular or annular cross sections. In other embodiments, one or more components have differently shaped (triangular, square, hexagonal, etc.) cross sections. By way of example, the nozzle body 100 may have a square cross section, and the plates 154 of the stream straightener 150 may also be square to match the inner surface 112. In another alternative embodiment, the straight portion 102 of the nozzle body 100 is tapered such that the cross-sectional area of the passage 106 reduces within the straight portion 102 as the passage 106 extends away from the inlet 14. In such an embodiment, one of the plates 154 of the stream straightener 150 may be larger to facilitate contact with the inner surface 112.

Figure 2:
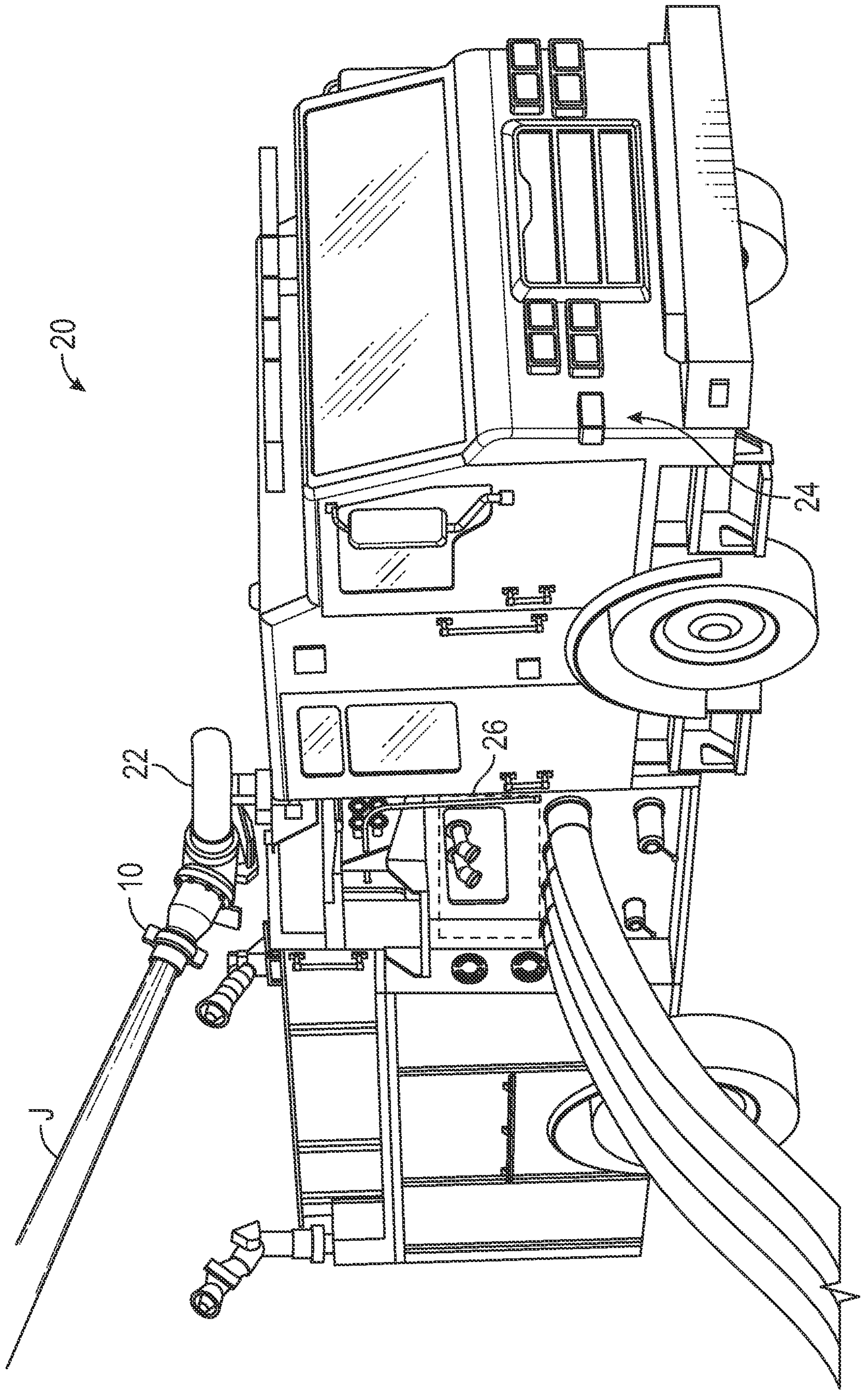
FIG. 2 is a perspective view of a fire apparatus configured to use the nozzle assembly of FIG. 1.

Referring to FIGS. 1-3, in operation, the nozzle assembly 10 is fluidly coupled to the high-pressure fluid source 134 (e.g., by fastening the mounting flange 130 to the mounting flange 136, etc.). Once the high-pressure fluid source 134 provides a high-pressure supply of fluid, high-pressure fluid enters into the nozzle assembly 10 into the passage 106 through the inlet 14. The fluid flows along the length of the passage 106 until coming into contact with the stream straightener 19. At this point, although the fluid generally flows along longitudinal axis 12, the fluid is likely turbulent and unstructured in its flow. By way of example, certain portions of the fluid may flow in directions not aligned with the longitudinal axis 12 (e.g., laterally) and the fluid may form eddies. Upon encountering the stream straightener 19, some or all of the fluid is forced into the passages of the stream straightener 19 (e.g., the passages 170 of the tubes 152). Inside of each of the passages, lateral movement of the fluid is reduced through contact with the inner surface of the stream straightener 19 (e.g., the inner surface 162). Accordingly, upon exiting the stream straightener 19, turbulence is reduced and the fluid uniformly flows along the longitudinal axis 12. Further movement of the fluid through the passage 106 brings the fluid into the reducer 104, where the diameter of the passage 106 is reduced to the diameter $D_O$, increasing the velocity of the fluid. The fluid then enters the passage of the nozzle 17 (e.g., the nozzle passage 204), where the diameter of the passages reduces, again increasing the velocity of the fluid. The fluid then exits through the outlet 16, forming a jet of fluid that the operator may aim towards a target area.

Figure 22:
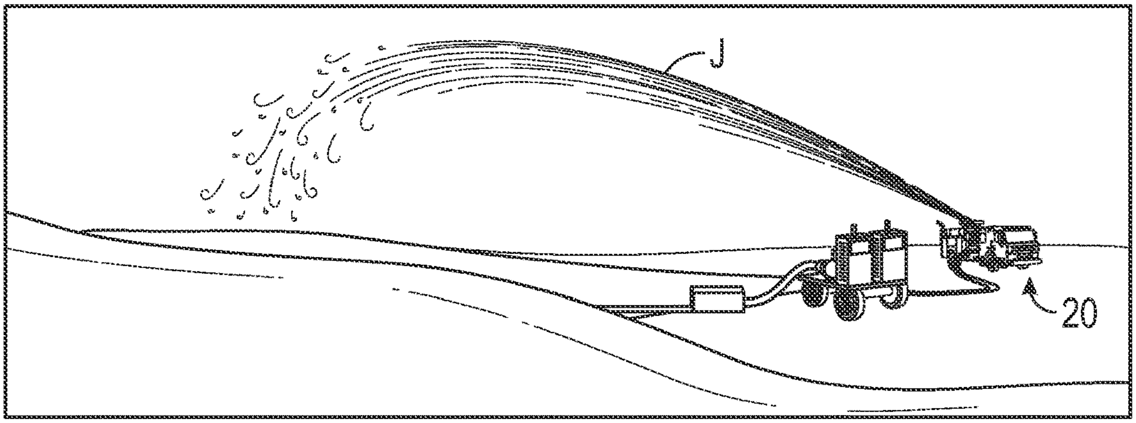
FIG. 22 is a perspective view of jet of fluid formed by a nozzle assembly of a fire fighting vehicle.
Figure 23:
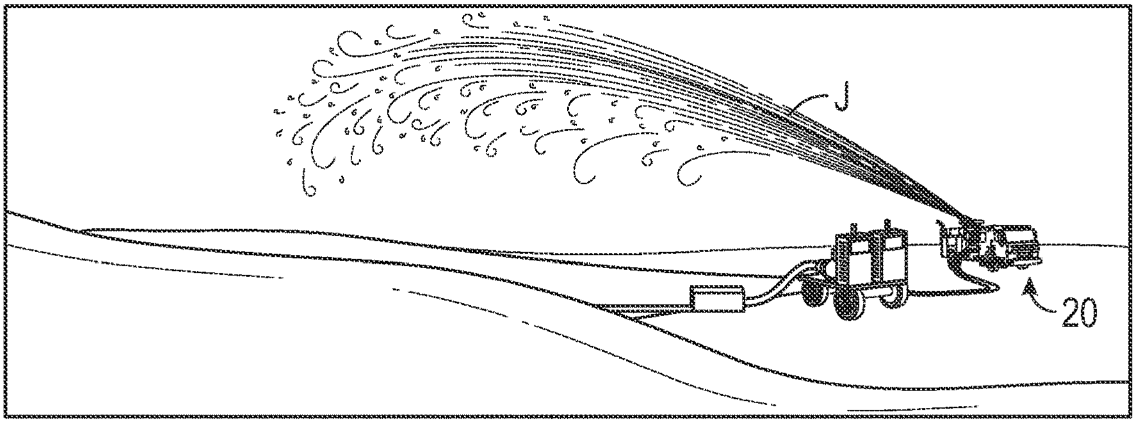
FIG. 23 is a perspective view of a jet of fluid formed by the nozzle assembly of FIG. 1 with the stream straightener of FIG. 12 removed.
Figure 24:
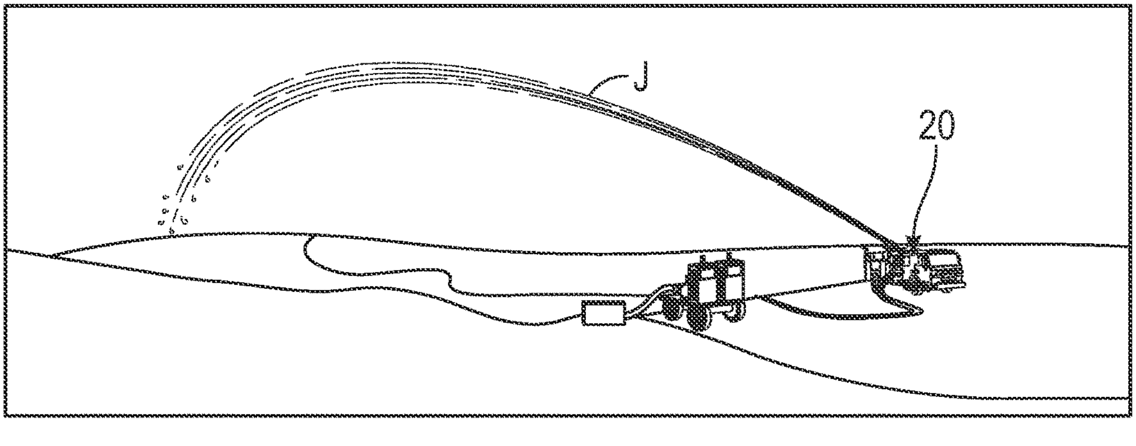
FIG. 24 is a perspective view of a jet of fluid formed by the nozzle assembly of FIG. 1 including the stream straightener of FIG. 12.

FIGS. 22-24 illustrate the effect of the stream straightener 19 on a jet J of fluid. In each figure, the flow rate of fluid is approximately 5,050 gallons per minute. FIG. 22 shows the jet J produced by a conventional smooth bore nozzle having a diameter of 3.5 inches at the outlet and experiencing an inlet pressure of 196 psi. The jet J experiences fluid fallout (i.e., fluid leaving the desired stream trajectory), reducing the amount of fluid that reaches the target area. FIG. 23 shows the jet J produced by the nozzle assembly 10 with the stream straightener 19 removed.

Figure 19:
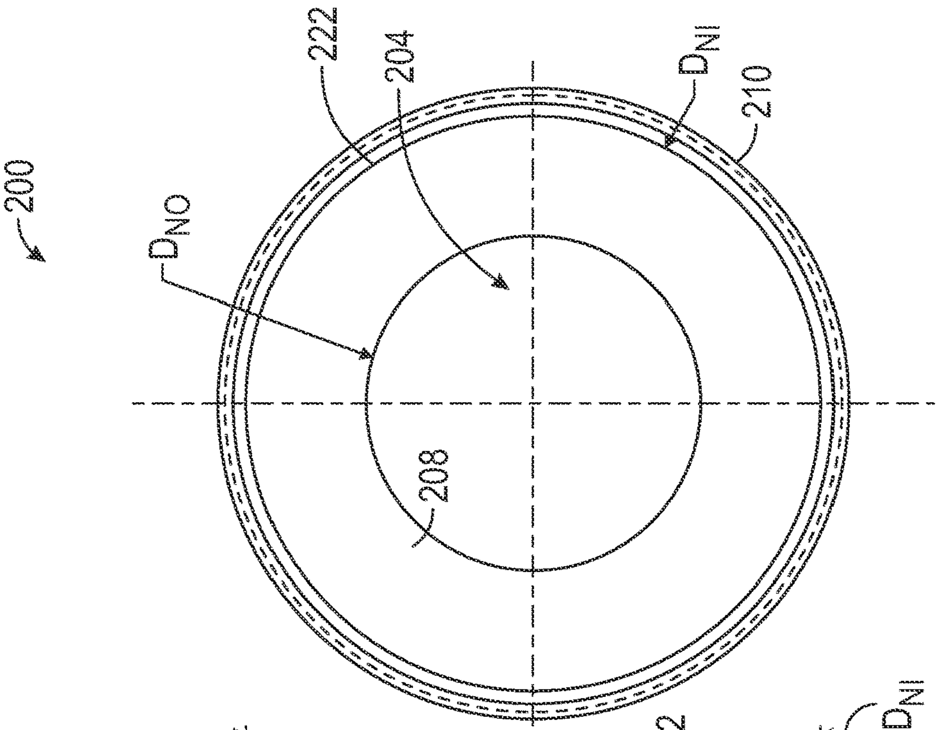
FIG. 19 is a rear view of the nozzle of FIG. 18.
Figure 18:
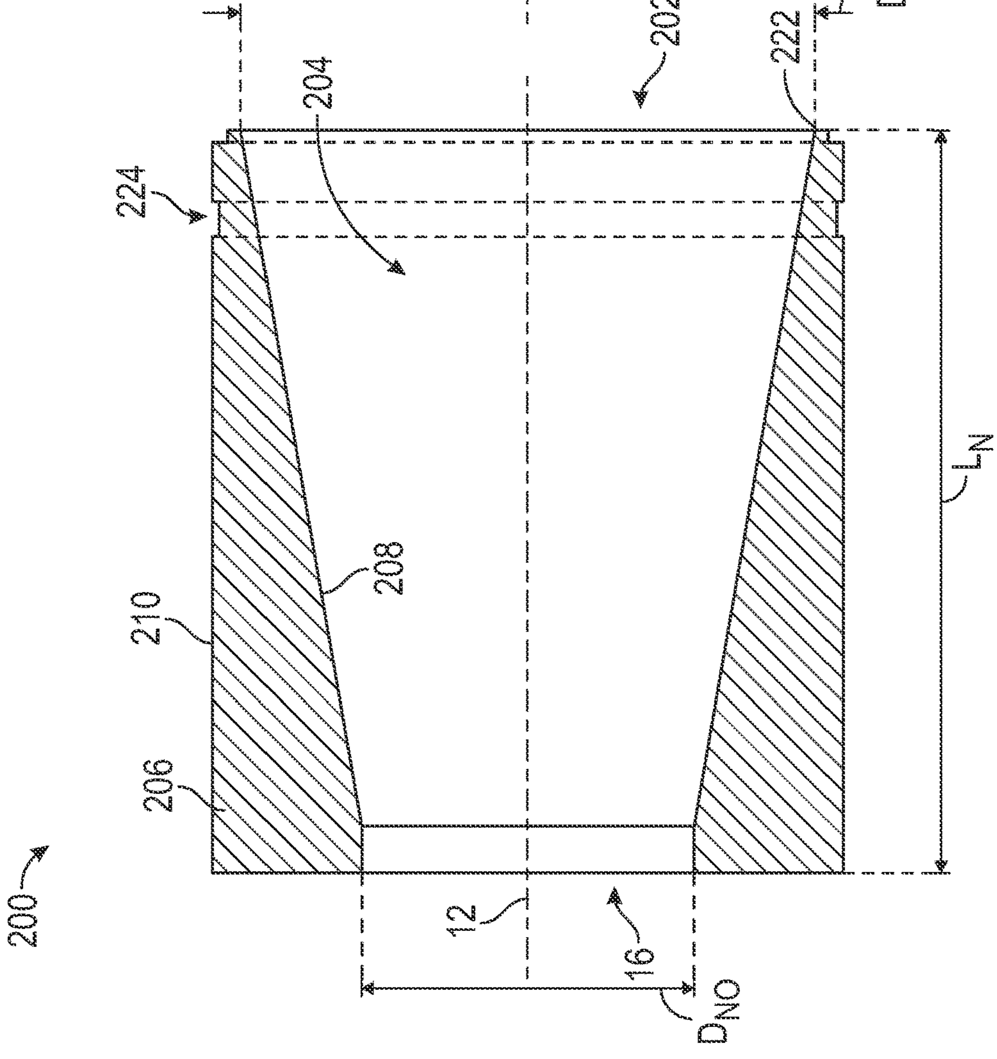
FIG. 18 is a side section view of a nozzle of a nozzle assembly, according to an exemplary embodiment.
Figure 21:
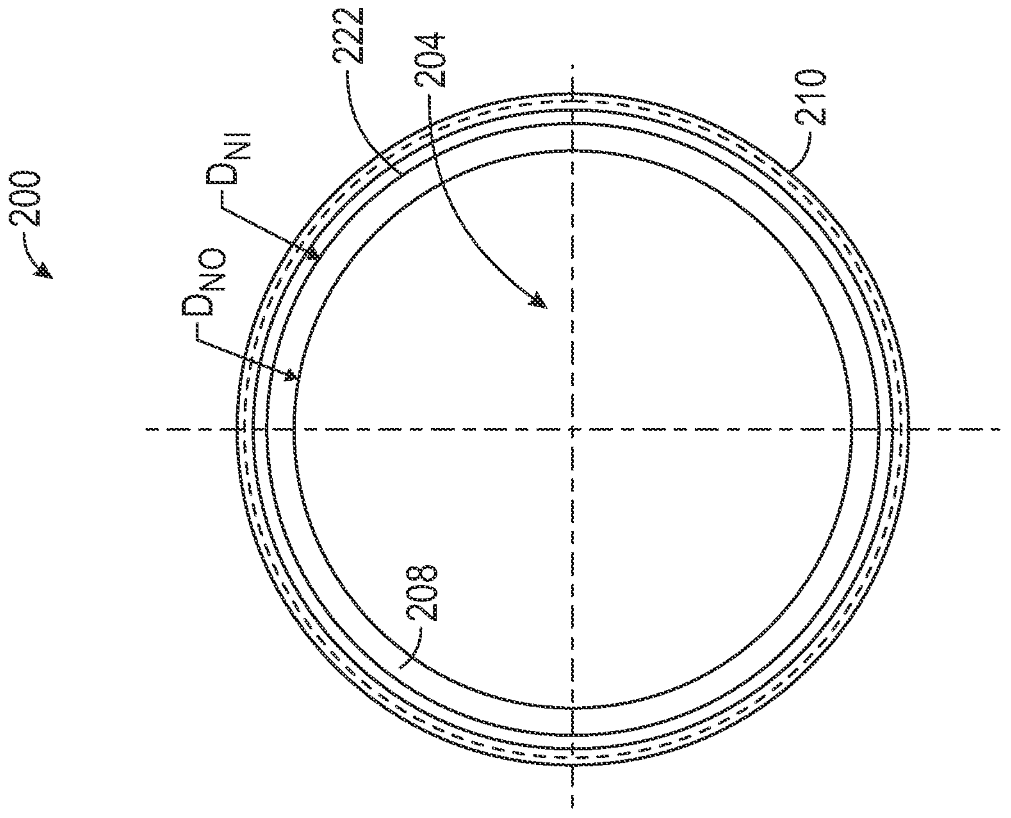
FIG. 21 is a rear view of the nozzle of FIG. 20.
Figure 20:
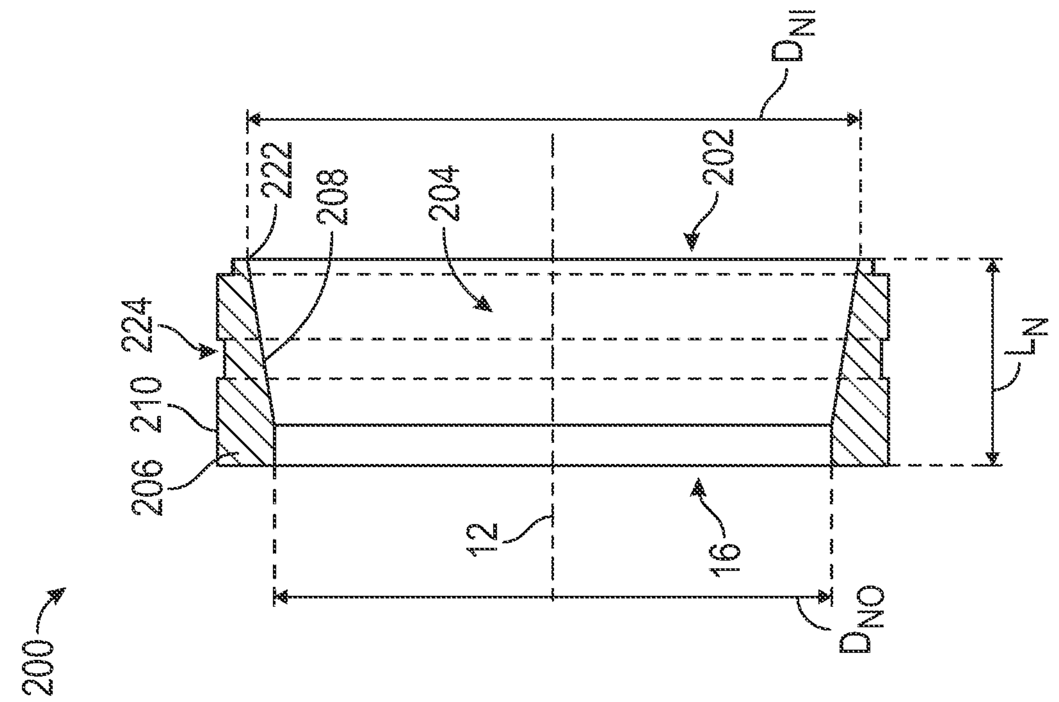
FIG. 20 is a side section view of a nozzle of a nozzle assembly, according to another exemplary embodiment.

The nozzle assembly 10 is configured using the nozzle 200 shown in FIGS. 18 and 19 and experiences a pressure of 231 psi at the inlet 14. The jet J experiences significant fluid fallout in this configuration. FIG. 24 shows the jet J produced by the nozzle assembly 10 including the stream straightener 19. The nozzle assembly 10 is again configured with the nozzle 200 shown in FIGS. 18 and 19 and experiences a pressure of 247 psi at the inlet 14. Due to the addition of the stream straightener 19, the jet J experiences very little fluid fallout, such that the vast majority of the fluid reaches the target area, reducing fluid waste. The fluid fallout experienced in this configuration is significantly less than that experienced when using the conventional smooth bore nozzle. The stream straightener 19 facilitates pumping fluid through the nozzle assembly 10 at a higher pressure than the conventional nozzle. Additionally, adding the stream straightener 19 increases the range of the jet J. As shown, the jet J extends a distance of 602 feet. This extended range keeps personnel and equipment farther away from the dangers of a fire. The extended range facilitates distributing fluid to locations that would otherwise be inaccessible from the ground, such as the upper floors of skyscrapers.

Figure 25:
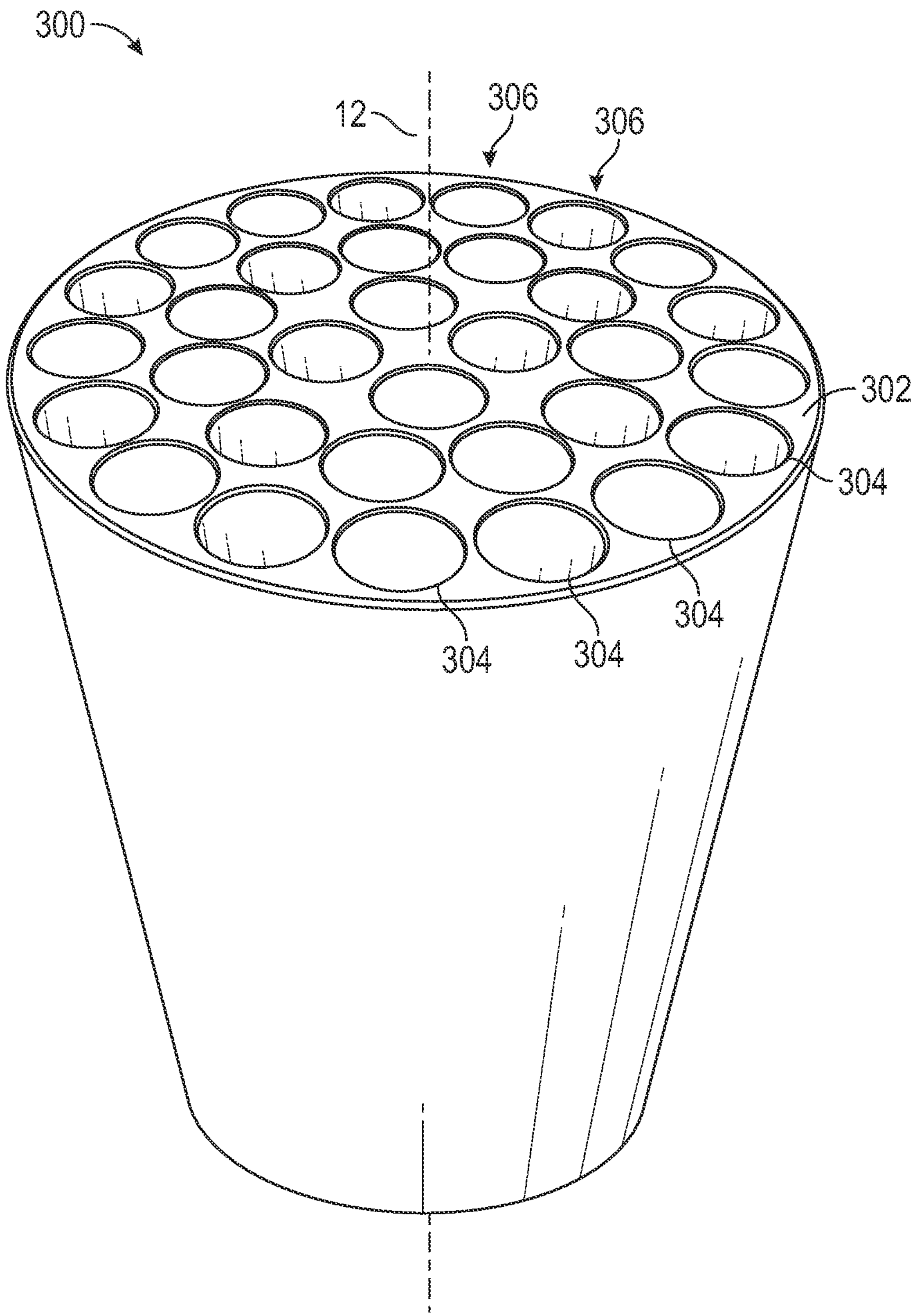
FIG. 25 is a perspective view of a stream straightener for a nozzle assembly, according to an exemplary embodiment.

Referring to FIG. 25, a stream straightener 300 is shown as an alternative embodiment of the stream straightener 19. The stream straightener 300 may be substantially similar to the stream straightener 150 except as described herein. The stream straightener 300 includes a main body, shown as cylindrical body 302, which performs similar functions to the tubes 152 and the plates 154 of the stream straightener 150. The cylindrical body 302 defines a series of passages 304 that are cylindrical and extend parallel to one another. As such, a cross section of each passage 304 taken perpendicular to the longitudinal axis 12 forms a circle. The area of this cross section is substantially constant throughout the length of the stream straightener 300 (e.g., the passage 304 is not tapered). Each of the passages 304 extends between an inlet 306 and an outlet. As shown, each of the passages 304 has equal diameters. In other embodiments, the stream straightener 300 includes a different number of passages 304 and/or the passages 304 have nonuniform cross-sectional areas and/or shapes (e.g., some passages 304 are larger than others).

Figure 26:
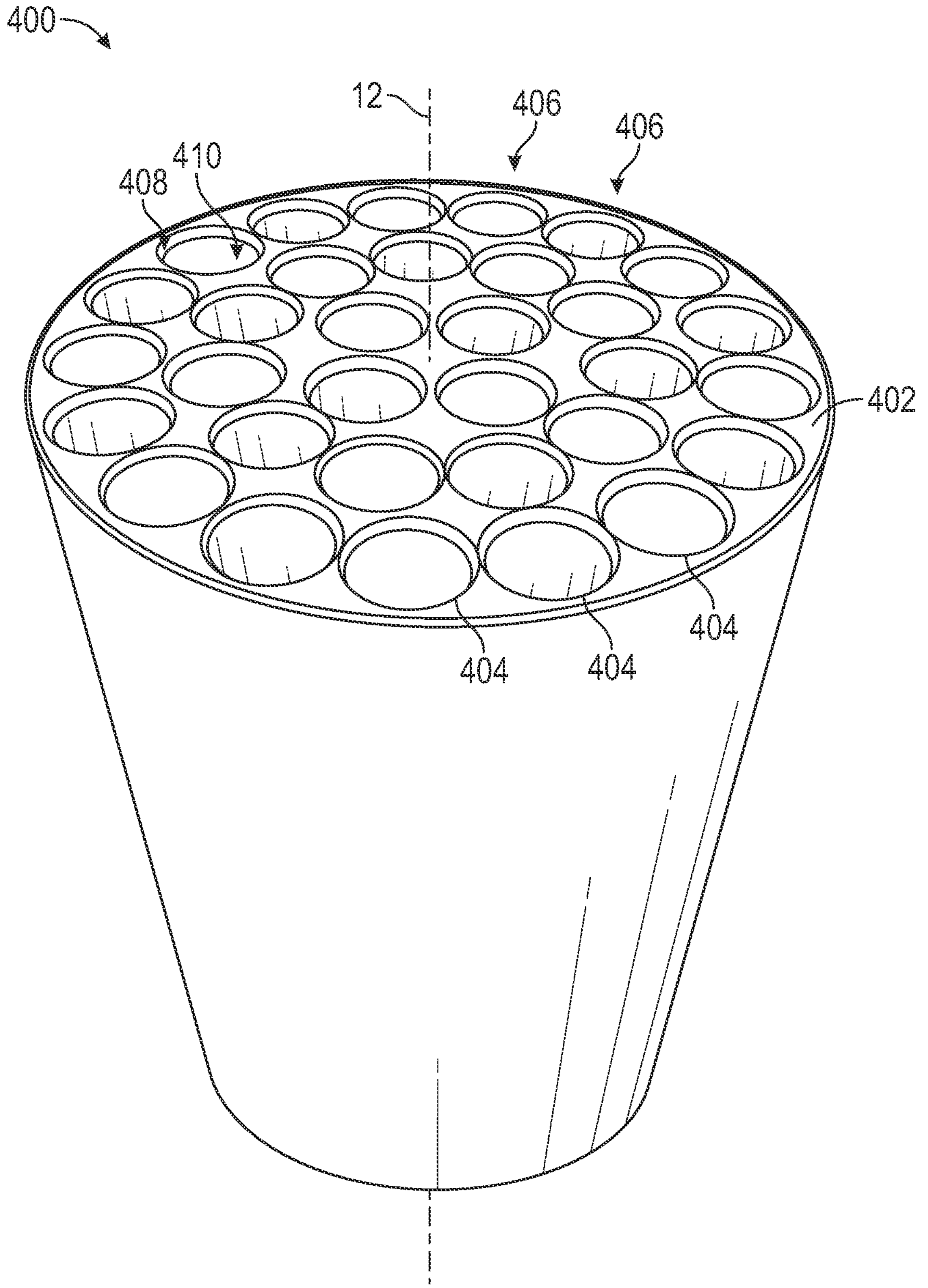
FIG. 26 is a perspective view of a stream straightener for a nozzle assembly, according to another exemplary embodiment.

Referring to FIG. 26, a stream straightener 400 is shown as another alternative embodiment of the stream straightener 19. The stream straightener 400 includes a cylindrical body 402 that defines a series of passages 404. Each passage 404 extends between an inlet 406 and an outlet. The stream straightener 400 is substantially similar to the stream straightener 300, except that each passage 404 includes a tapered portion 408 and a straight portion 410. The tapered portion 408 is positioned near the inlet 406, and the straight portion 410 is positioned downstream of the tapered portion 408 (i.e., closer to the outlet). The tapered portion 408 is frustoconical or otherwise tapered (e.g., otherwise continuously decreases in cross-sectional area). As such, a cross section of the tapered portion 408 taken perpendicular to the longitudinal axis 12 forms a circle. The area of this cross section decreases as the distance between the inlet 406 and the cross section increases. The straight portion 410 is cylindrical. As such, a cross section of the straight portion 410 taken perpendicular to the longitudinal axis 12 forms a circle. The area of this cross section is substantially constant throughout the length of the stream straightener 400. At the intersection between the tapered portion 408 and the straight portion 410, the cross-sectional areas of the tapered portion 408 and the straight portion 410 are equal. The addition of the tapered portion 408 increases flow through the stream straightener 400 relative to the stream straightener 300 for a given scenario (e.g., where the high-pressure fluid source 134, the length of the main body, and the diameters of the cylindrical portions of the passages are the same for both flow straighteners).

Figure 27:
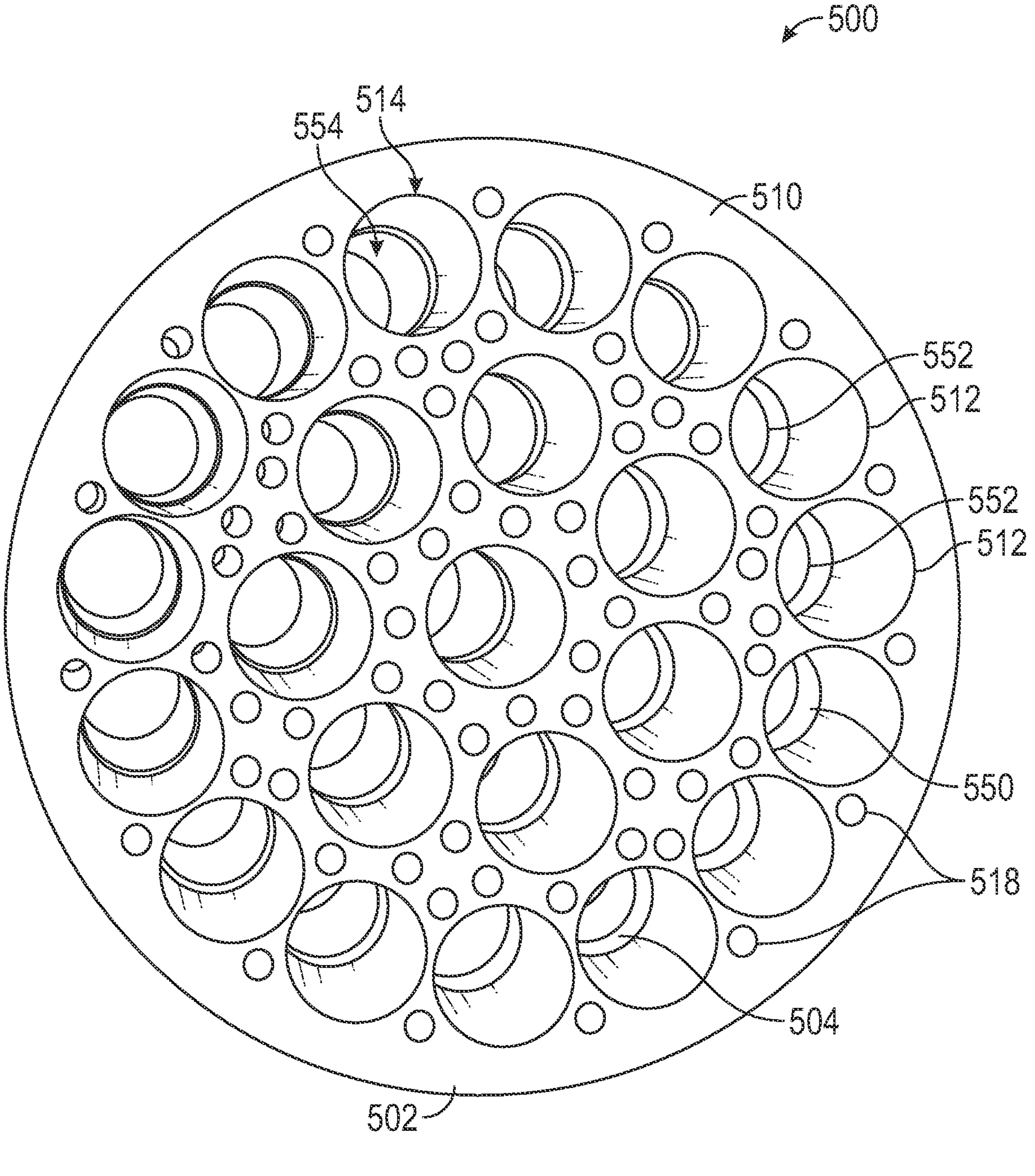
FIG. 27 is a perspective view of a stream straightener assembly for a nozzle assembly, according to an exemplary embodiment.
Figure 28:
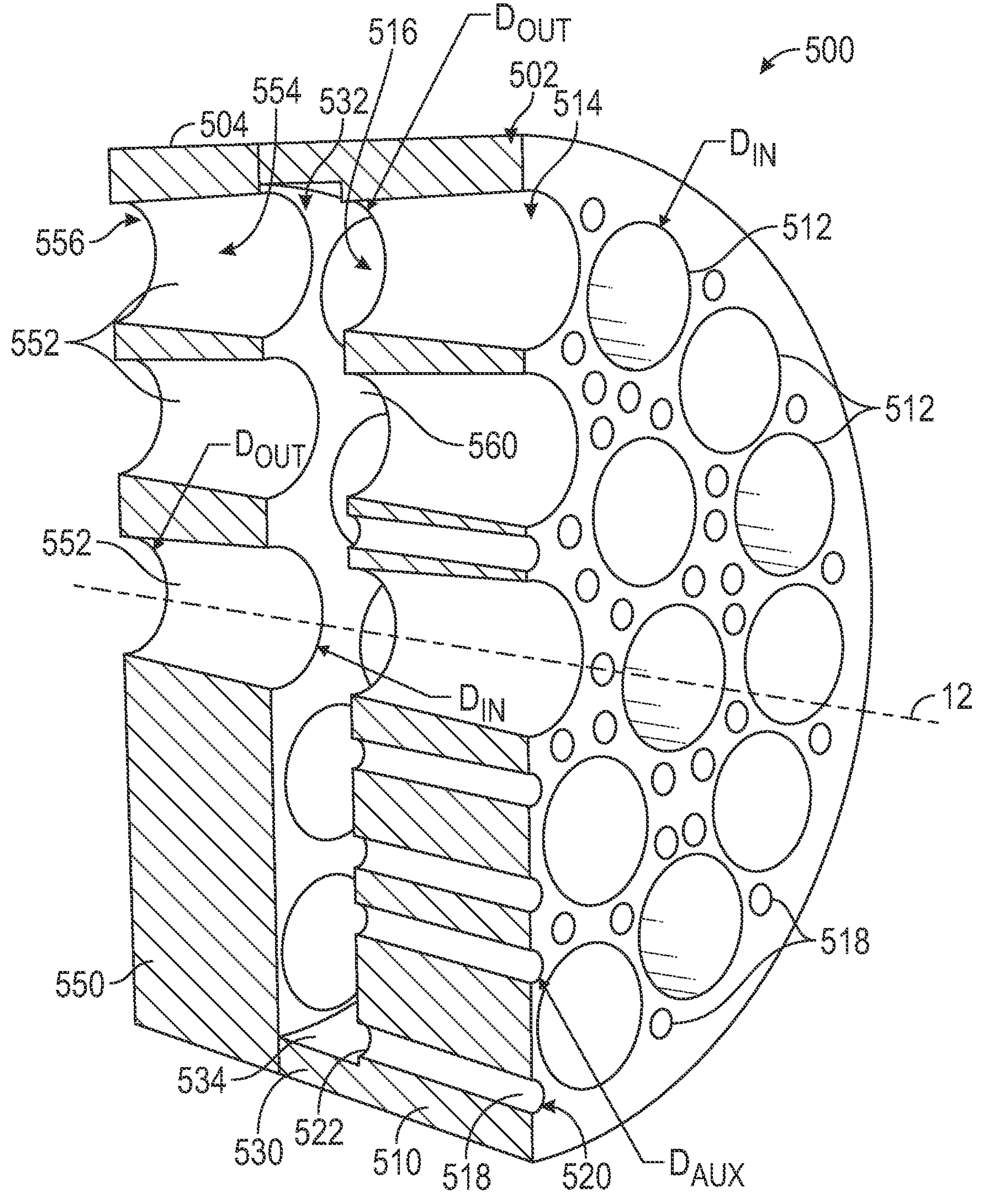
FIG. 28 is a section view of the stream straightener assembly of FIG. 27.

Referring to FIGS. 27-30, a stream straightener assembly 500 is shown as another alternative embodiment of the stream straightener 19. The stream straightener assembly 500 includes a first flow straightener or stream straightener, shown as stream straightener 502, configured to be positioned upstream of a second flow straightener or stream straightener, shown as stream straightener 504. Although FIGS. 27 and 28 show the stream straightener 502 and the stream straightener 504 assembled to form the stream straightener assembly 500, it should be understood that the stream straightener 502 and the stream straightener 504 may be used independently or in combination with one another.

Figure 29:
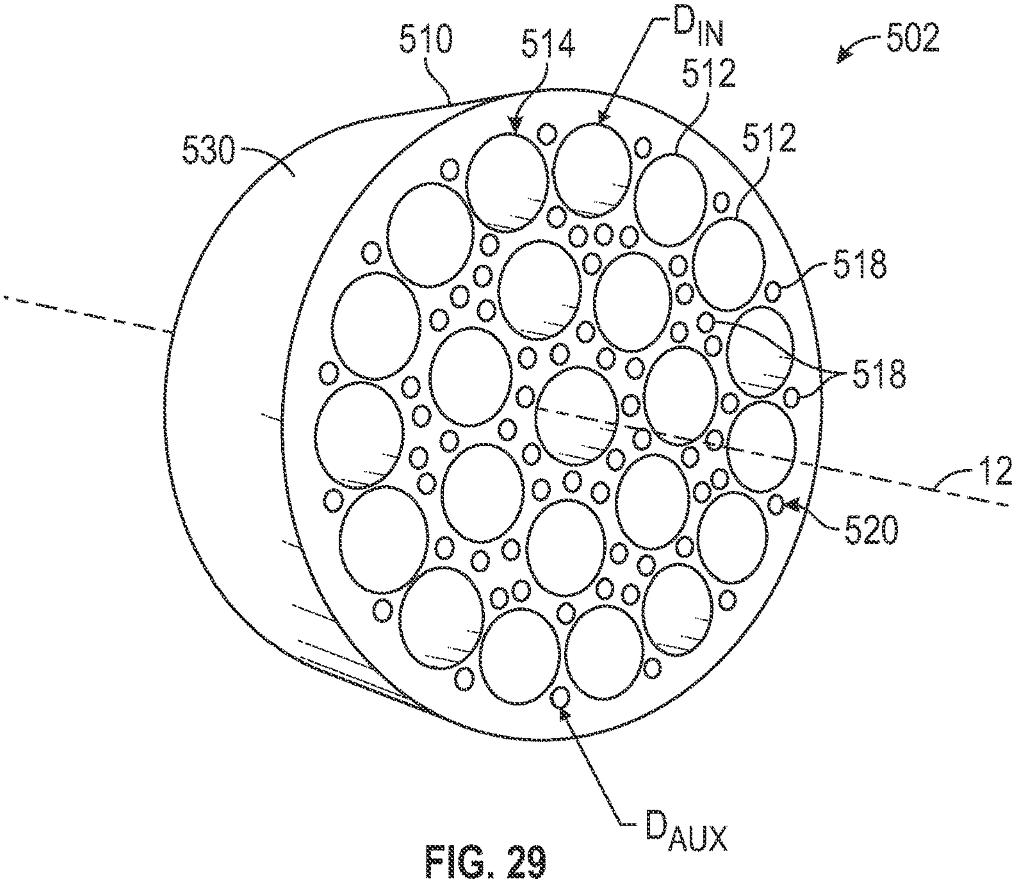
FIG. 29 is a perspective view of a first stream straightener of the stream straightener assembly of FIG. 27.

Referring to FIGS. 28 and 29, the stream straightener 502 includes a main body, shown as body 510. The body 510 defines a first series of tapered passages, shown as primary passages 512, extending through the body 510 parallel to the longitudinal axis 12. Each primary passage 512 extends between an inlet 514 and an outlet 516. The primary passages 512 are frustoconical or otherwise tapered (e.g., otherwise continuously decrease in cross-sectional area). Accordingly, the cross-sectional area of each primary passage 512 taken perpendicular to the longitudinal axis 12 is larger at the inlet 514 than at the outlet 516. In the embodiment shown in FIG. 28, a cross section of each primary passage 512 taken perpendicular to the longitudinal axis 12 forms a circle. This cross section has a diameter $D_{IN}$ at the inlet 514 and a diameter $D_{OUT}$ at the outlet 516, where $D_{IN}$ is greater than $D_{OUT}$. The primary passages 512 straighten fluid passing there through. Additionally, due to the decreasing cross-sectional area of the primary passages 512, the velocity of the fluid increases as it passes through the primary passages 512.

The body 510 additionally defines a second series of makeup or auxiliary passages, shown as secondary passages 518, extending parallel to the longitudinal axis 12. The secondary passages 518 each extend between an inlet 520 and an outlet 522. The secondary passages 518 are cylindrical. As such, a cross section of each secondary passage 518 taken perpendicular to the longitudinal axis 12 forms a circle. The area of this cross section is substantially constant throughout the length of the body 510. Each secondary passage 518 has a diameter $D_{AUX}$ which is smaller than the diameter of each primary passage 512 at its smallest point (e.g., the diameter $D_{OUT}$ at the outlet 516). As the lengths of the primary passages 512 and the secondary passages 518 are equal, each secondary passage 518 encloses a smaller volume (e.g., the volume of the secondary passage 518 between the inlet 520 and the outlet 522) than each primary passage 512 (e.g., the volume of the primary passage 512 between the inlet 514 and the outlet 516). As shown, $D_{OUT}$ is approximately 4 times the size of $D_{AUX}$. Accordingly, the cross-sectional area of each primary passage 512 at the outlet is approximately 16 times larger than the cross-sectional area of each secondary passage 518. In other embodiments, $D_{OUT}$ may be 1.1 times, 2 times, 3 times, 5 times, 8 times, or 10 times the size of $D_{AUX}$. The addition of the secondary passages 518 facilitates flowing more fluid through the stream straightener 502, which increases the flow through the nozzle assembly 10 and decreases the pressure drop across the nozzle assembly 10.

The primary passages 512 are arranged in concentric rings or circles, with one primary passage 512 positioned in the center of the body 510, seven primary passages 512 positioned in a ring surrounding that, and fifteen primary passages 512 in a ring immediately surrounding that. In total, the body 510 defines 23 primary passages 512. The secondary passages 518 are positioned between the primary passages 512 (e.g., between the rings of primary passages 512, within the rings of primary passages 512). In total, the body 510 defines 65 secondary passages 518. In other embodiments, the body 510 is configured with different quantities, sizes, and/or positions of the primary passages 512 and the secondary passages 518.

Referring to FIG. 28, the stream straightener 502 further includes an annular protrusion, shown as spacer 530, extending longitudinally from the body 510. The spacer 530 spaces the stream straightener 504 apart from the body 510 such that a volume, shown as convergence chamber 532, is formed between the body 510, the stream straightener 504, and an interior surface 534 of the spacer 530. The length of the spacer 530 may be changed between different embodiments to vary the volume of the convergence chamber 532. The interior surface 534 of the spacer 530 is centered about the longitudinal axis 12. To facilitate flow through the body 510, the interior surface 534 is positioned radially outward from all of the primary passages 512 and the secondary passages 518. In other embodiments, the spacer 530 is an individual component separate from the body 510. In yet other embodiments, the stream straightener 502 is otherwise held offset from the stream straightener 504.

Figure 30:
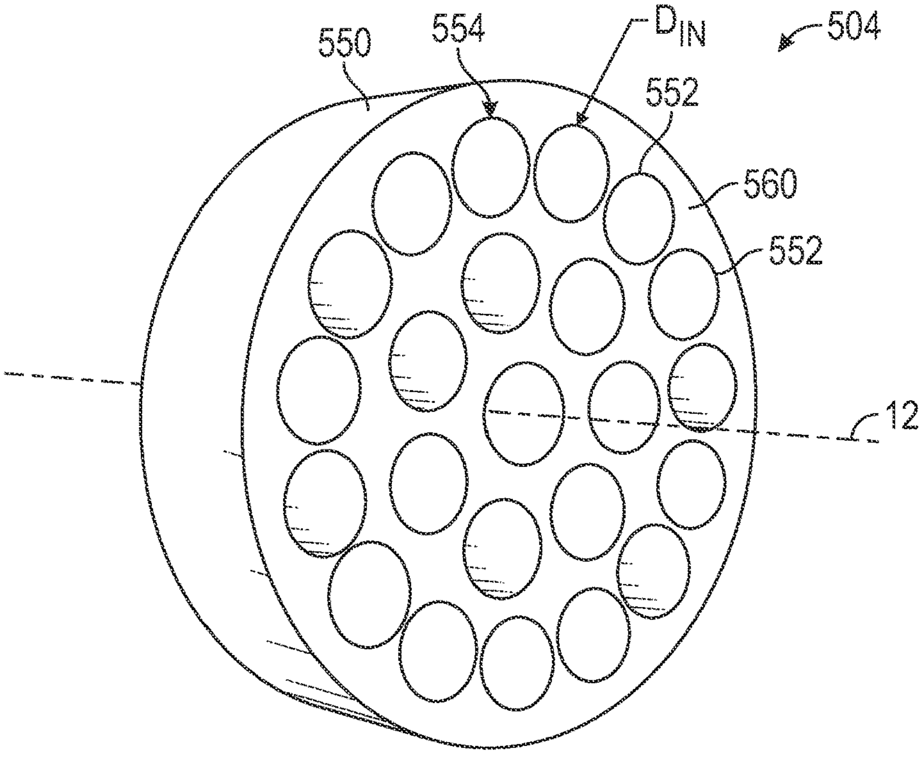
FIG. 30 is a perspective view of a second stream straightener of the stream straightener assembly of FIG. 27.

Referring to FIGS. 28 and 30, the stream straightener 504 is substantially similar to the stream straightener 502, except the stream straightener 504 does not include the secondary passages 518 or the spacer 530. The stream straightener 504 includes a main body, shown as body 550. The body 550 defines a series of tapered passages, shown as passages 552, extending through the body 550 parallel to the longitudinal axis 12. Each passage 552 extends between an inlet 554 and an outlet 556. The passages 552 are frustoconical or otherwise tapered.

Accordingly, the cross-sectional area of each passage 552 taken perpendicular to the longitudinal axis 12 is larger at the inlet 554 than at the outlet 556. In the embodiment shown in FIG. 28, a cross section of each primary passage 512 taken perpendicular to the longitudinal axis 12 forms a circle. As shown, the passages 552 are the same size as the primary passages 512 (e.g., having the diameter $D_{IN}$ at the inlet 554 and the diameter $D_{OUT}$ at the outlet 556). In other embodiments, the passages 552 have different sizes or shapes than the primary passages 512. By way of example, the diameter of the cross section of each passage 552 may be greater than $D_{IN}$ at the inlet 554 and less than $D_{OUT}$ at the outlet 556.

The central axes of the passages 552 are positioned to align with the central axes of the primary passages 512 such that fluid flowing through each primary passage 512 subsequently flows through the corresponding passage 552. Accordingly, the passages 552 are completely aligned with the primary passages 512. In other embodiments, the passages 552 are partially aligned with the primary passages 512 such that a portion of the fluid flowing through the primary passage 512 changes course (e.g., moves laterally) prior to flowing through the passages 552. To facilitate alignment, the quantity and positions of the passages 552 on the body 550 are the same as the quantity and positions of the primary passages 512 on the body 510. To further facilitate alignment of the passages, the body 510 is clocked (i.e., rotationally fixed) about the longitudinal axis 12 relative to the body 550. By way of example, the body 550 and the body 510 may both be welded to the spacer 530. By way of another example, the body 550 may be configured to receive one or more protrusions from the spacer 530. By way of yet another example, the body 510 and the body 550 may each define a slot or keyway configured to receive a protrusion extending radially inward from the nozzle body 100.

Because the stream straightener 504 omits the secondary passages 518, the secondary passages 518 are not aligned with passages of the stream straightener 502. Instead, the secondary passages 518 are aligned with a face 560 of the stream straightener 504. The fluid that passes through the secondary passages 518 changes course (e.g., moves laterally) within the convergence chamber 532 to reach the passages 552.

In addition to changes to the size and positions of the various passages of the stream straightener assembly 500, other modifications to the stream straightener assembly 500 are contemplated as well. The shapes of the various passages may be varied. By way of example, the primary passages 512 and/or the passages 552 may be cylindrical instead of tapered. By way of another example, the secondary passages 518 may be tapered instead of cylindrical. The secondary passages 518 may be omitted from the body 510, and/or secondary passages 518 may be added to the body 550. The rotational alignment of the stream straightener 502 and the stream straightener 504 may be varied. By way of example, the stream straighteners may be arranged such that central axes of the primary passages 512 and the passages 552 do not align, but such that most of the cross-sectional area of the primary passages 512 still aligns with the cross-sectional area of the passages 552.

When the stream straightener assembly 500 is used in the nozzle assembly 10, fluid from the high-pressure fluid source 134 passes into the stream straightener 502 through the inlets 514 and the inlets 520. The majority of the fluid passes through the primary passages 512, where the fluid is straightened and its velocity is increased. A smaller portion of the fluid passes through the secondary passages 518, where the fluid is straightened. Upon reaching the outlet 516 or the outlet 522, the fluid enters the convergence chamber 532. The fluid passes longitudinally through the convergence chamber and into the inlets 554 of the stream straightener 504. While passing through the convergence chamber 532, the fluid from the secondary passages 518 converges with the fluid from the primary passages 512 in order to enter the passages 552. Aligning the primary passages 512 and the passages 552 minimizes any turbulence introduced into fluid through contact with the face of the body 550. The fluid passes through the passages 552, where the fluid is again straightened and its velocity is again increased. The fluid then exits the stream straightener assembly 500 through the outlets 556.

Figure 31:
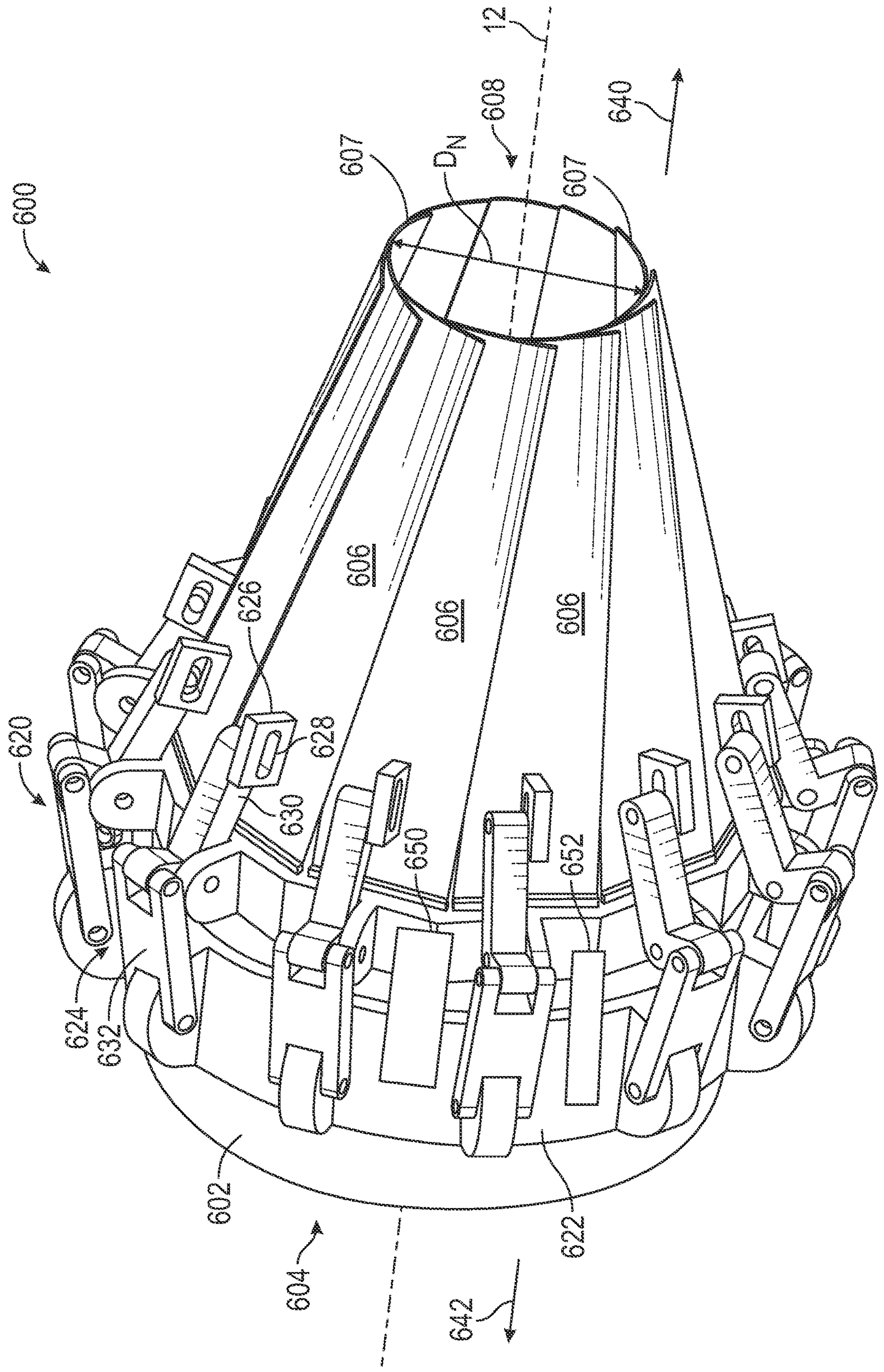
FIG. 31 is a perspective view of a variable-geometry nozzle for a nozzle assembly, according to an exemplary embodiment.
Figure 32:
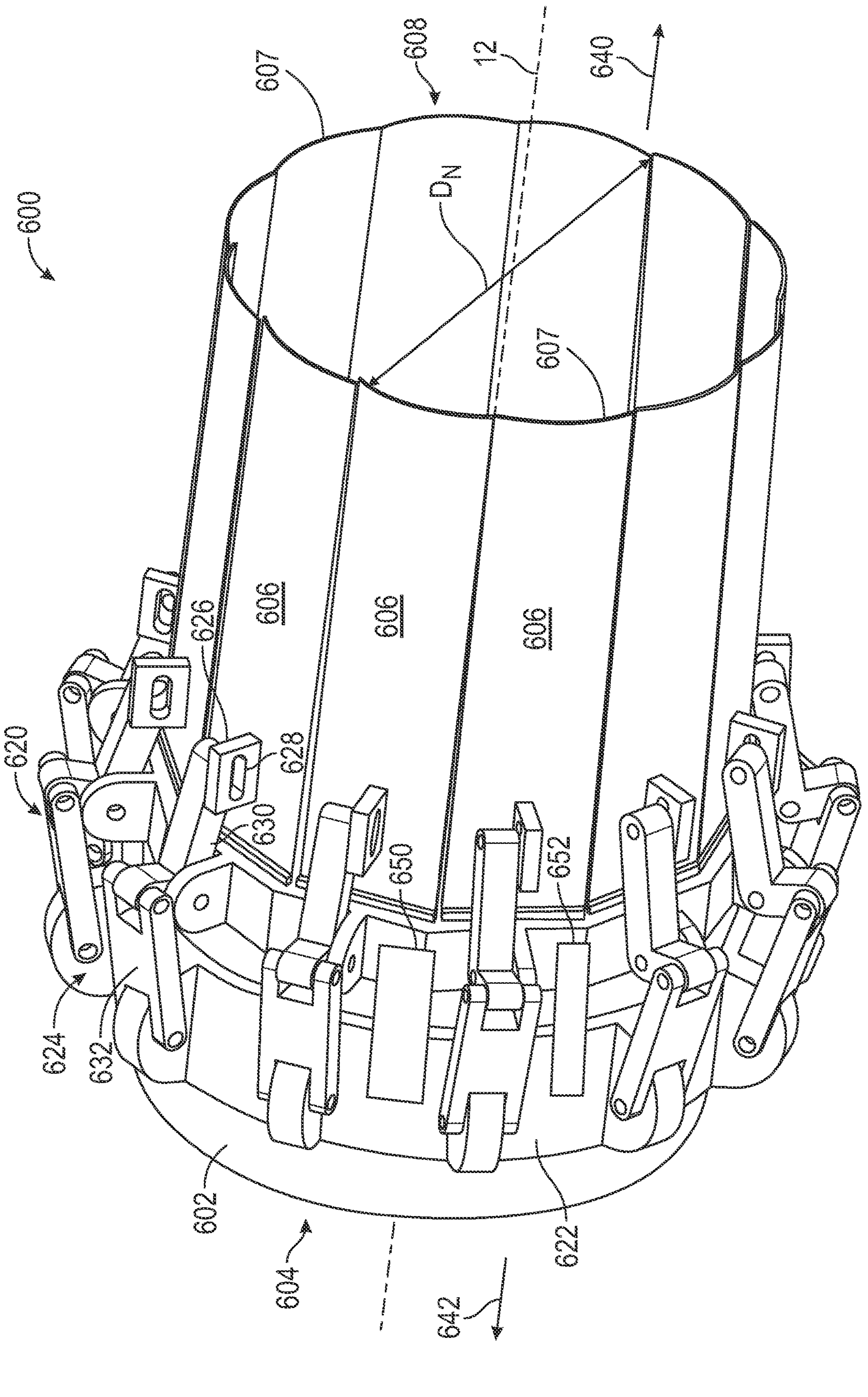
FIG. 32 is another perspective view of the variable-geometry nozzle of FIG. 31.

Referring to FIGS. 31 and 32, an adjustable nozzle, variable-geometry nozzle, or nozzle tip assembly, shown as nozzle 600, is shown as an alternative embodiment of the nozzle 17. The nozzle 600 may be substantially similar to the nozzle 200 except as described herein. The nozzle 600 includes a main body 602 that is configured to be coupled to the nozzle body 100 (e.g., removably coupled using a ring coupler, fixedly coupled with welding, etc.). The main body 602 is annular and defines an inlet 604 in fluid communication with the outlet 108 of the nozzle body 100.

A series of plates, shown as petals 606, are pivotally coupled to the main body 602 opposite the inlet 604. Specifically, a first end portion of each petal 606 is pivotally coupled to the main body 602. The petals 606 each extend away from the main body 602 along the longitudinal axis 12. The petals 606 are arranged about the circumference of the main body 602. Each petal 606 pivots about a different axis of rotation such that a second end portion of each petal 606 opposite the first end portion can move towards and away from the longitudinal axis 12. By way of example, the petals 606 may be pivotally coupled to the main body 602 with a series of hinges. Each axis of rotation of the petals 606 is positioned tangent to a circle that is centered about and perpendicular to the longitudinal axis 12. Adjacent the main body 602 (e.g., at the first end portion), each petal 606 is substantially flat, facilitating rotation of the petal 606 about its respective axis of rotation. As each petal 606 extends away from the main body 602, the curvature thereof increases. The petals 606 are sized, shaped, and positioned such that each petal 606 overlaps one adjacent petal 606 and is overlapped by another adjacent petal 606. The second end portion of each petal 606 distal from the main body 602 has an edge 607. The edges 607 cooperate to form an aperture 608 that acts as the outlet 16 of the nozzle assembly 10 and forms the jet J. The aperture 608 is substantially circular and has a diameter $D_N$ centered about the longitudinal axis 12.

As shown in FIGS. 31 and 32, the petals 606 are pivotable about their respective axes of rotation to vary the diameter $D_N$ of the aperture 608. The nozzle 600 includes an actuator assembly, shown as nozzle adjuster 620. The nozzle adjuster 620 is configured to move the petals 606 in unison (e.g., simultaneously and the same distance), thereby retaining the substantially circular shape of the aperture 608 throughout the range of movement of the petals 606. FIG. 31 represents the smallest setting of the nozzle adjuster 620 (i.e., the position where the diameter $D_N$ is smallest), and FIG. 32 represents the largest setting, according to an exemplary embodiment. In FIG. 31 $D_N$ is equal to 1.75 inches, and in FIG. 32 $D_N$ is equal to 3.75 inches. Different smallest and largest setting values may be provided, according to various embodiments.

Referring again to FIGS. 31 and 32, the nozzle adjuster 620 includes an annular component or sliding member, shown as actuator ring 622. In one embodiment, actuator ring 622 is slidably coupled to the main body 602. The actuator ring 622 receives the main body 602 and is configured to move parallel to the longitudinal axis 12. The nozzle adjuster 620 further includes a set of linkage assemblies 624 coupling the petals 606 to the actuator ring 622. Specifically, each petal 606 has a corresponding linkage assembly 624 that couples the movement of that petal 606 to the movement of the actuator ring 622. Each petal 606 includes a protrusion 626 extending therefrom. Each protrusion 626 defines a slot 628 extending along the length of the corresponding petal 606.

Each linkage assembly 624 includes a first link, shown as link 630, extending between the corresponding petal 606 and the main body 602. Each link 630 is pivotally coupled to the main body 602 (e.g., through a pinned connection) proximate a first end of the link 630. Proximate an opposing second end of the link 630, a connecting member, such as a pin, extends from the link 630 and through the slot 628, pivotally and slidably coupling the link 630 to the corresponding petal 606. Each linkage assembly 624 further includes a second link, shown as link 632, extending between the actuator ring 622 and the corresponding link 630. A first end of the link 632 is pivotally coupled to the actuator ring 622, and an opposing second end of the link 632 is pivotally coupled to the link 630.

The linkage assemblies 624 couple the movement of the actuator ring 622 to the movement of the petals 606. Accordingly, each position of the actuator ring 622 corresponds to a position of the petals 606 and thus to an area of the aperture 608. To close the aperture 608 (i.e., to reduce the diameter $D_N$ and the area of the aperture 608), the actuator ring 622 is moved in a first direction 640 toward the petals 606. The actuator ring 622 moves the first end of the link 632 in the first direction 640. The link 632 exerts a force on the link 630, which rotates the link 630 inward toward the longitudinal axis 12. The link 630 rotates the corresponding petal 606 inward toward the longitudinal axis 12, reducing the size of the aperture 608. To open the aperture 608 (i.e., to increase the diameter $D_N$ and the area of the aperture 608), the actuator ring 622 is moved in a second direction 642 opposite the first direction 640. The actuator ring 622 moves the first end of the link 632 in the second direction 642. The link 632 exerts a force on the link 630, which rotates the link 630 outward away from the longitudinal axis 12. The link 630 rotates the corresponding petal 606 outward away from the longitudinal axis 12, increasing the size of the aperture 608.

Figure 33:
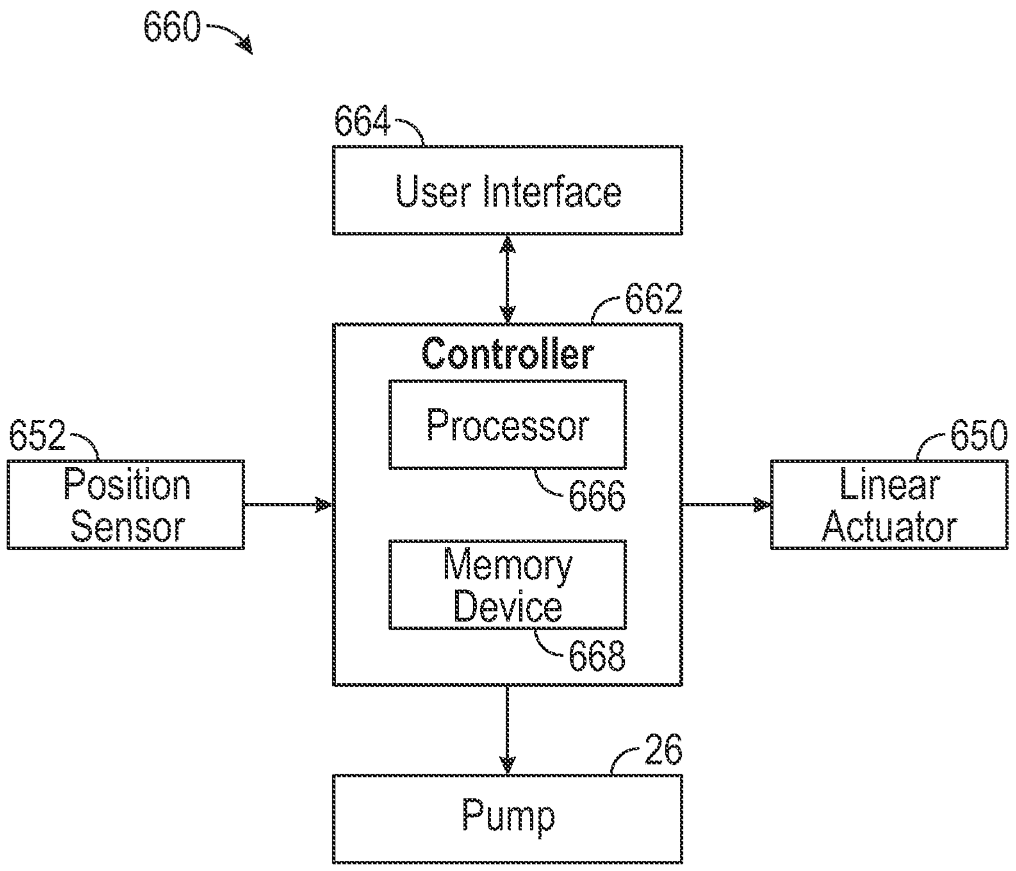
FIG. 33 is a block diagram of a control system of the fire apparatus of FIG. 2, according to an exemplary embodiment.

Referring to FIGS. 31-33, the nozzle 600 further includes an actuator, shown as linear actuator 650, configured to adjust the size of the aperture 608. The linear actuator 650 may be a hydraulic cylinder, a pneumatic cylinder, an electric linear actuator such as a motorized lead screw, or another type of linear actuator. In one embodiment, the linear actuator 650 extends between the main body 602 and the actuator ring 622. In other embodiments, the linear actuator 650 is otherwise positioned. In still other embodiments, the nozzle 600 includes another type of actuator configured to adjust the size of the aperture 608 by moving the petals 606 (e.g., a rotational actuator, etc.). The linear actuator 650 is configured to retract and extend, thereby moving the actuator ring 622 in the first direction 640 and the second direction 642 relative to the main body 602. Accordingly, the linear actuator 650 may be extended and retracted to adjust the size of the aperture 608. In other embodiments, the nozzle 600 includes another type of actuator. By way of example, the actuator may be a cam-based actuator that varies the longitudinal position of the actuator ring 622 based on the rotation of a cam. In any of the embodiments described herein, the actuator ring 622 may be biased the first direction 640 or the second direction 642 by one or more biasing members (e.g., springs, etc.).

Referring again to FIGS. 31-33, the nozzle 600 further includes a sensor, shown as position sensor 652, configured to sense the position of the actuator ring 622 relative to the main body 602. As shown, the position sensor 652 is coupled to the main body 602 and the actuator ring 622. Alternatively, the position sensor 652 may be configured to measure the current extended length of the linear actuator 650. In such embodiments, the position sensor 652 may be incorporated into the linear actuator 650. In some embodiments, the position sensor 652 is a linear variable differential transformer (LVDT) that is configured to output a variable voltage based on a measured position.

FIG. 33 illustrates a control system 660 of the fire apparatus 20. The control system 660 includes a processing circuit or controller 662 configured to receive measurement data from the position sensor 652 and control operation of the linear actuator 650. The controller 662 is in communication with a user interface 664 (e.g., a touch screen display, buttons, joysticks, etc.). The controller 662 may additionally be configured to control the operation of one or more subsystems of the fire apparatus 20, such as the pump 26. The controller 662 can include a processor 666 and memory device 668. The processor 666 can be implemented as a general purpose processor, an application specific integrated circuit (ASIC), one or more field programmable gate arrays (FPGAs), a group of processing components, or other suitable electronic processing components. The memory device 668 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 668 may be or include volatile memory or non-volatile memory. The memory device 668 may include database components, object code components, script components, or any other type of information structure for supporting the various activities and information structures described in the present application. According to an exemplary embodiment, the memory device 668 is communicably connected to the processor 666 through a processing circuit and includes computer code for executing (e.g., by processing circuit and/or processor) one or more processes described herein.

In operation, a user can interact with the user interface 664 to control the size of the aperture 608 and vary the characteristics of the jet J leaving the nozzle assembly 10. By way of example, the user interface 664 may include a touch screen display with a graphical user interface. A user may select a desired size of the aperture 608 directly, or the user may select to increase or decrease the size of the aperture 608. The user interface 664 provides the desired size of the aperture 608 to the controller 662. The controller 662 is configured to determine the current size of the aperture 608 using measurement data provided by the position sensor 652. By way of example, the memory device 668 may store a predetermined relationship between the measurement data from the position sensor 652 (e.g., corresponding to the length of the linear actuator 650 or the position of the actuator ring 622) and the size of the aperture 608. In response to receiving a desired size of the aperture 608 from the user interface 664, the controller 662 may control the linear actuator 650 to reach the desired size of the aperture 608 using feedback from the position sensor 652.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet; and a second flow straightener coupled to the nozzle body and extending at least partially across the nozzle body passage, the second flow straightener defining a third passage and a fourth passage each fluidly coupling the inlet and the outlet;

wherein the first passage is tapered such that a cross-sectional area of the first passage decreases as the first passage extends towards the outlet; and wherein the second flow straightener is positioned between the first flow straightener and the outlet of the nozzle body.

2. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet; and a second flow straightener coupled to the nozzle body and extending at least partially across the nozzle body passage, the second flow straightener defining a third passage and a fourth passage each fluidly coupling the inlet and the outlet;

wherein the first passage defines a first passage inlet and a first passage outlet;

wherein the second passage defines a second passage inlet and a second passage outlet; and wherein at least one of (a) a cross-sectional area of the second passage inlet is less than a cross-sectional area of the first passage inlet and (b) a cross-sectional area of the second passage outlet is less than a cross-sectional area of the first passage outlet.

3. The nozzle assembly of claim 2, wherein the cross-sectional area of the second passage inlet is less than the cross-sectional area of the first passage inlet.

4. The nozzle assembly of claim 2, wherein the cross-sectional area of the second passage outlet is less than the cross-sectional area of the first passage outlet.

5. The nozzle assembly of claim 2, wherein at least one of the first passage and the second passage has a circular cross-section.

6. The nozzle assembly of claim 2, wherein the second flow straightener is positioned between the first flow straightener and the outlet of the nozzle body.

7. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet; and a second flow straightener coupled to the nozzle body and extending at least partially across the nozzle body passage, the second flow straightener defining a third passage and a fourth passage each fluidly coupling the inlet and the outlet;

wherein the first passage of the first flow straightener is aligned with the third passage of the second flow straightener; and wherein the second passage of the first flow straightener is aligned with a face of the second flow straightener.

8. The nozzle assembly of claim 7, wherein the face of the second flow straightener is substantially planar.

9. The nozzle assembly of claim 7, wherein the first flow straightener is positioned between the inlet of the nozzle body and the second flow straightener.

10. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet; and a second flow straightener coupled to the nozzle body and extending at least partially across the nozzle body passage, the second flow straightener defining a third passage and a fourth passage each fluidly coupling the inlet and the outlet;

wherein the first passage defines a first passage inlet and a first passage outlet;

wherein the second passage defines a second passage inlet and a second passage outlet;

wherein the first passage is tapered such that a cross-sectional area of the first passage decreases as the first passage extends from the first passage inlet to the first passage outlet; and wherein a cross-sectional area of the second passage is substantially constant from the second passage inlet to the second passage outlet.

11. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet a second flow straightener coupled to the nozzle body and extending at least partially across the nozzle body passage, the second flow straightener defining a third passage and a fourth passage each fluidly coupling the inlet and the outlet; and a nozzle tip assembly fluidly coupled to the outlet of the nozzle body, the nozzle tip assembly including a plurality of plates each pivotally coupled to the nozzle body, wherein the plates cooperate to define an aperture fluidly coupled to the outlet of the nozzle body, wherein at least one of the plates overlaps an adjacent one of the plurality of plates, and wherein the plates are configured to rotate relative to the nozzle body to vary a cross-sectional area of the aperture.

12. The nozzle assembly of claim 11, further comprising an actuator assembly including a plurality of links, wherein each link is pivotally coupled to one of the plates and to the nozzle body such that rotation of the links relative to the nozzle body causes a corresponding rotation of the plates relative to the nozzle body.

13. The nozzle assembly of claim 12, wherein the actuator assembly further includes a sliding member slidably coupled to the nozzle body and coupled to the links, wherein movement of the sliding member in a first direction reduces the cross-sectional area of the aperture, and wherein movement of the sliding member in a second direction opposite the first direction increases the cross-sectional area of the aperture.

14. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining:

a first passage fluidly coupling the inlet and the outlet, the first passage defining a first passage inlet and a first passage outlet; and a second passage each fluidly coupling the inlet and the outlet, the second passage defining a second passage inlet and a second passage outlet; and a second flow straightener coupled to the nozzle body and extending at least partially across the nozzle body passage, the second flow straightener defining a third passage and a fourth passage each fluidly coupling the inlet and the outlet, wherein at least one of (a) a cross-sectional area of the second passage inlet is less than a cross-sectional area of the first passage inlet and (b) a cross-sectional area of the second passage outlet is less than a cross-sectional area of the first passage outlet;

wherein the first passage is tapered such that a cross-sectional area of the first passage decreases as the first passage extends towards the outlet, and wherein the second flow straightener is positioned between the first flow straightener and the outlet of the nozzle body;

wherein the first passage of the first flow straightener is aligned with the third passage of the second flow straightener, and wherein the second passage of the first flow straightener is aligned with a face of the second flow straightener; and wherein a cross-sectional area of the second passage is substantially constant from the second passage inlet to the second passage outlet.

15. A nozzle assembly, comprising:

a nozzle body defining an inlet, an outlet, and a nozzle body passage extending between the inlet and the outlet;

a first flow straightener coupled to the nozzle body and extending at least partially across the nozzle body passage, the first flow straightener defining a first passage and a second passage each fluidly coupling the inlet and the outlet; and a second flow straightener coupled to the nozzle body and extending at least partially across the nozzle body passage, the second flow straightener defining a third passage and a fourth passage each fluidly coupling the inlet and the outlet;

wherein the first passage is tapered such that a cross-sectional area of the first passage decreases as the first passage extends toward the outlet, and wherein a cross-sectional area of the second passage is substantially constant.

* * * * *